(12) United States Patent
Powderly et al.

(10) Patent No.: US 12,014,464 B2
(45) Date of Patent: *Jun. 18, 2024

(54) CONTEXTUAL AWARENESS OF USER INTERFACE MENUS

(71) Applicant: Magic Leap, Inc., Plantation, FL (US)

(72) Inventors: James M. Powderly, Ft. Lauderdale, FL (US); Alysha Naples, London (GB); Paul Armistead Hoover, Bothell, WA (US); Tucker Spofford, Seattle, WA (US)

(73) Assignee: MAGIC LEAP, INC., Plantation, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/714,496

(22) Filed: Apr. 6, 2022

(65) Prior Publication Data

US 2022/0230404 A1 Jul. 21, 2022

Related U.S. Application Data

(63) Continuation of application No. 15/599,162, filed on May 18, 2017, now Pat. No. 11,328,484.

(Continued)

(51) Int. Cl.
*G06T 19/00* (2011.01)
*G02B 27/01* (2006.01)
(Continued)

(52) U.S. Cl.
CPC .......... *G06T 19/006* (2013.01); *G02B 27/017* (2013.01); *G06F 3/011* (2013.01);
(Continued)

(58) Field of Classification Search
None
See application file for complete search history.

(56) References Cited

U.S. PATENT DOCUMENTS 5,590,268 A 12/1996 Doi et al.
6,396,509 B1 5/2002 Cheng
(Continued)

FOREIGN PATENT DOCUMENTS

EP 3118722 A1 1/2017
EP 3665550 A1 6/2020
(Continued)

OTHER PUBLICATIONS

International Search Report and Written Opinion for PCT Application No. PCT/US17/33399, dated Aug. 14, 2017.
(Continued)

*Primary Examiner* — Sarah Le
(74) *Attorney, Agent, or Firm* — KLINTWORTH & ROZENBLAT IP LLP

(57) ABSTRACT

Examples of systems and methods for a wearable system to automatically select or filter available user interface interactions or virtual objects are disclosed. The wearable system can select a group of virtual objects for user interaction based on contextual information associated with the user, the user's environment, physical or virtual objects in the user's environment, or the user's physiological or psychological state.

20 Claims, 17 Drawing Sheets

Related U.S. Application Data

(60) Provisional application No. 62/380,869, filed on Aug. 29, 2016, provisional application No. 62/339,572, filed on May 20, 2016.

(51) Int. Cl.
| | | |
|---|---|---|
| *G06F 3/01* | (2006.01) | |
| *G06F 3/04815* | (2022.01) | |
| *G06F 3/0482* | (2013.01) | |
| *G06K 7/14* | (2006.01) | |
| *G06K 19/06* | (2006.01) | |
| *G06V 40/10* | (2022.01) | |

(52) U.S. Cl.
CPC .............. *G06F 3/012* (2013.01); *G06F 3/013* (2013.01); *G06F 3/015* (2013.01); *G06F 3/04815* (2013.01); *G06F 3/0482* (2013.01); *G06K 7/1408* (2013.01); *G06K 19/06009* (2013.01); *G06V 40/107* (2022.01); *G06F 3/017* (2013.01)

(56) References Cited

U.S. PATENT DOCUMENTS

| | | |
|---|---|---|
| 6,771,294 B1 | 8/2004 | Pulli et al. |
| 6,850,221 B1 | 2/2005 | Tickle |
| 7,564,476 B1 | 7/2009 | Coughlan et al. |
| D658,094 S | 4/2012 | Dunn |
| 8,950,867 B2 | 2/2015 | Macnamara |
| 9,081,426 B2 | 7/2015 | Armstrong |
| 9,215,293 B2 | 12/2015 | Miller |
| 9,310,559 B2 | 4/2016 | Macnamara |
| 9,319,632 B2 | 4/2016 | Kim et al. |
| 9,348,143 B2 | 5/2016 | Gao et al. |
| D758,367 S | 6/2016 | Natsume |
| 9,384,594 B2 | 7/2016 | Maciocci et al. |
| 9,417,452 B2 | 8/2016 | Schowengerdt et al. |
| 9,470,906 B2 | 10/2016 | Kaji et al. |
| 9,547,174 B2 | 1/2017 | Gao et al. |
| 9,671,566 B2 | 6/2017 | Abovitz et al. |
| 9,740,006 B2 | 8/2017 | Gao |
| 9,791,700 B2 | 10/2017 | Schowengerdt et al. |
| 9,851,563 B2 | 12/2017 | Gao et al. |
| 9,857,591 B2 | 1/2018 | Welch et al. |
| 9,874,749 B2 | 1/2018 | Bradski |
| 11,328,484 B2 | 5/2022 | Powderly et al. |
| 2004/0113885 A1 | 6/2004 | Genc et al. |
| 2006/0007304 A1 | 1/2006 | Anderson |
| 2006/0028436 A1 | 2/2006 | Armstrong |
| 2007/0081123 A1 | 4/2007 | Lewis |
| 2009/0066725 A1 | 3/2009 | Nogami et al. |
| 2010/0177117 A1 | 7/2010 | Finn et al. |
| 2011/0141043 A1 | 6/2011 | Soubrie |
| 2012/0127062 A1 | 5/2012 | Bar-Zeev et al. |
| 2012/0162549 A1 | 6/2012 | Gao et al. |
| 2012/0249416 A1 | 10/2012 | Maciocci et al. |
| 2013/0013229 A1 | 1/2013 | Norieda et al. |
| 2013/0082922 A1 | 4/2013 | Miller |
| 2013/0104085 A1 | 4/2013 | Mlyniec et al. |
| 2013/0117377 A1 | 5/2013 | Miller |
| 2013/0125027 A1 | 5/2013 | Abovitz |
| 2013/0174213 A1 | 7/2013 | Liu et al. |
| 2013/0208234 A1 | 8/2013 | Lewis |
| 2013/0242262 A1 | 9/2013 | Lewis |
| 2014/0003762 A1 | 1/2014 | Macnamara |
| 2014/0035959 A1 | 2/2014 | Lapstun |
| 2014/0063060 A1 | 3/2014 | Maciocci et al. |
| 2014/0071539 A1 | 3/2014 | Gao |
| 2014/0168262 A1 | 6/2014 | Forutanpour et al. |
| 2014/0177023 A1 | 6/2014 | Gao et al. |
| 2014/0184589 A1 | 7/2014 | Vesely |
| 2014/0191872 A1 | 7/2014 | Gomi et al. |
| 2014/0218468 A1 | 8/2014 | Gao et al. |
| 2014/0267420 A1 | 9/2014 | Schowengerdt |
| 2014/0306866 A1 | 10/2014 | Miller et al. |
| 2014/0333666 A1 | 11/2014 | Poulos et al. |
| 2014/0354532 A1 | 12/2014 | Mullins |
| 2014/0375683 A1 | 12/2014 | Salter et al. |
| 2015/0016777 A1 | 1/2015 | Abovitz et al. |
| 2015/0091943 A1 | 4/2015 | Lee et al. |
| 2015/0103306 A1 | 4/2015 | Kaji et al. |
| 2015/0178939 A1 | 6/2015 | Bradski et al. |
| 2015/0187357 A1* | 7/2015 | Xia ............ G06F 3/005 704/275 |
| 2015/0193018 A1 | 7/2015 | Venable et al. |
| 2015/0205126 A1 | 7/2015 | Schowengerdt |
| 2015/0222883 A1 | 8/2015 | Welch |
| 2015/0222884 A1 | 8/2015 | Cheng |
| 2015/0231509 A1 | 8/2015 | McMain, II et al. |
| 2015/0268415 A1 | 9/2015 | Schowengerdt et al. |
| 2015/0286858 A1 | 10/2015 | Shaburov et al. |
| 2015/0302652 A1 | 10/2015 | Miller et al. |
| 2015/0309263 A2 | 10/2015 | Abovitz et al. |
| 2015/0326570 A1 | 11/2015 | Publicover et al. |
| 2015/0346490 A1 | 12/2015 | TeKolste et al. |
| 2015/0346495 A1 | 12/2015 | Welch et al. |
| 2016/0011419 A1 | 1/2016 | Gao |
| 2016/0018885 A1 | 1/2016 | Kimura et al. |
| 2016/0026253 A1 | 1/2016 | Bradski et al. |
| 2016/0127624 A1 | 5/2016 | Woo et al. |
| 2016/0187974 A1 | 6/2016 | Mallinson |
| 2016/0188181 A1 | 6/2016 | Smith |
| 2016/0379408 A1 | 12/2016 | Wright et al. |
| 2017/0337742 A1 | 11/2017 | Powderly et al. |
| 2021/0286483 A1 | 9/2021 | Josephson |

FOREIGN PATENT DOCUMENTS

| | | |
|---|---|---|
| JP | H04372012 A | 12/1992 |
| JP | H06337884 A | 12/1994 |
| JP | 11288342 A | 10/1999 |
| JP | 2006-126936 A | 5/2006 |
| JP | 2007222284 A | 9/2007 |
| JP | 2009069918 A | 4/2009 |
| JP | 2009-295031 A | 12/2009 |
| JP | 2011159273 A | 8/2011 |
| JP | 2013-152711 A | 8/2013 |
| JP | 2014-134922 A | 7/2014 |
| JP | 2014134922 A | 7/2014 |
| JP | 2014-174747 A | 9/2014 |
| JP | 2014174747 A | 4/2015 |
| JP | 2016-031650 A | 3/2016 |
| JP | 2016-506565 A | 3/2016 |
| JP | 2016-508257 A | 3/2016 |
| JP | 2016507112 A | 3/2016 |
| JP | 5985116 | 8/2016 |
| JP | 2017500673 A | 1/2017 |
| KR | 20010012091 A | 2/2001 |
| KR | 2005-0087377 A | 8/2005 |
| KR | 20140090683 A | 7/2014 |
| KR | 2015-0095868 A | 8/2015 |
| KR | 20150095868 A | 8/2015 |
| WO | WO 2014/093477 | 6/2014 |
| WO | WO 2014/099231 | 6/2014 |
| WO | WO 2014/128507 | 8/2014 |
| WO | WO 2015/161307 | 10/2015 |
| WO | WO 2016/023123 | 2/2016 |
| WO | WO2016203792 A1 | 12/2016 |
| WO | WO 2017/201329 | 11/2017 |
| WO | WO2019067902 A1 | 4/2019 |

OTHER PUBLICATIONS

International Preliminary Report on Patentability for PCT Application No. PCT/US17/33399, dated Nov. 20, 2018.
ARToolKit: https://web.archive.org/web/20051013062315/http://www.hitl.washington.edu:80/artoolkit/documentation/hardware.htm, archived Oct. 13, 2005.
Azuma, "A Survey of Augmented Reality," Teleoperators and Virtual Environments 6, 4 (Aug. 1997), pp. 355-385. https://web.archive.org/web/20010604100006/http://www.cs.unc.edu/~azuma/ARpresence.pdf.

(56) References Cited

OTHER PUBLICATIONS

Azuma, "Predictive Tracking for Augmented Realty," TR95-007, Department of Computer Science, UNC—Chapel Hill, NC, Feb. 1995.
Bimber, et al., "Spatial Augmented Reality—Merging Real and Virtual Worlds," 2005 https://web.media.mit.edu/~raskar/book/BimberRaskarAugmentedRealityBook.pdf.
Christoforou, C. et al., "From the eyes and the heart: a novel eye-gaze metric that predicts video preferences of a large audience", Frontiers in Psychology, vol. 6: 579, published online May 12, 2015, in 14 pages. URL: http://www.ncbi.nlm.nih.gov/pmc/articles/PMC4428128/.
Jacob, "Eye Tracking in Advanced Interface Design," Human-Computer Interaction Lab Naval Research Laboratory, Washington, D.C. / paper/ in Virtual Environments and Advanced Interface Design, ed. by W. Barfield and T.A. Furness, pp. 258-288, Oxford University Press, New York (1995).
Tanriverdi and Jacob, "Interacting With Eye Movements in Virtual Environments," Department of Electrical Engineering and Computer Science, Tufts University, Medford, MA—paper/Proc. ACM CHI 2000 Human Factors in Computing Systems Conference, pp. 265-272, Addison-Wesley/ACM Press (2000).
Wikipedia: "Augmented cognition", Wikipedia, printed Aug. 6, 2016, in 4 pages. URL: https://en.wikipedia.org/wiki/Augmented_cognition.
Dana Slambekova et al, "Gaze and gesture based object manipulation in virtual worlds", Virtual Reality Software and Technology, ACM, 2 Penn Plaza, Suite 701 New York NY 10121-0701 USA, (Dec. 10, 2012), doi:10.1145/2407336.2407380, ISBN 978-1-4503-1469-5, pp. 203-204.
Office Action issued in counterpart Korean Patent Application No. 10-2023-7021779 dated Feb. 13, 2024 (5 pages).
Office Action issued in counterpart Korean Patent Application No. 10-2023-7025009 dated Mar. 11, 2024 (7 pages).

\* cited by examiner

CONTEXTUAL AWARENESS OF USER INTERFACE MENUS

CROSS-REFERENCE TO RELATED APPLICATIONS

This application is a continuation application of U.S. application Ser. No. 15/599,162, entitled "CONTEXTUAL AWARENESS OF USER INTERFACE MENUS," filed on May 18, 2017, which claims the benefit of priority under 35 U.S.C. § 119(e) to U.S. Provisional Application No. 62/339,572, filed on May 20, 2016, entitled "CONTEXTUAL AWARENESS OF USER INTERFACE MENUS," and U.S. Provisional Application No. 62/380,869, filed on Aug. 29, 2016, entitled "AUGMENTED COGNITION USER INTERFACE," the disclosures of which are hereby incorporated by reference herein in their entireties.

FIELD

The present disclosure relates to virtual reality and augmented reality imaging and visualization systems and more particularly to presenting and selecting virtual objects based on contextual information.

BACKGROUND

Modern computing and display technologies have facilitated the development of systems for so called "virtual reality", "augmented reality", or "mixed reality" experiences, wherein digitally reproduced images or portions thereof are presented to a user in a manner wherein they seem to be, or may be perceived as, real. A virtual reality, or "VR", scenario typically involves presentation of digital or virtual image information without transparency to other actual real-world visual input; an augmented reality, or "AR", scenario typically involves presentation of digital or virtual image information as an augmentation to visualization of the actual world around the user; a mixed reality, or "MR", related to merging real and virtual worlds to produce new environments where physical and virtual objects co-exist and interact in real time. As it turns out, the human visual perception system is very complex, and producing a VR, AR, or MR technology that facilitates a comfortable, natural-feeling, rich presentation of virtual image elements amongst other virtual or real-world imagery elements is challenging. Systems and methods disclosed herein address various challenges related to VR, AR and MR technology.

SUMMARY

In one embodiment, a wearable system for generating virtual content in a three-dimensional (3D) environment of a user is disclosed. The wearable system can comprise an augmented reality display configured to present virtual content in a 3D view to a user; a pose sensor configured to acquire position or orientation data of a user and to analyze the position or orientation data to identify a pose of the user; and a hardware processor in communication with the pose sensor and the display. The hardware processor can be programmed to: identify, based at least partly on the pose of the user, a physical object in the environment of the user in the 3D environment; receive an indication to initiate an interaction with the physical object; identify a set of virtual objects in the environment of the user which is associated with the physical object; determine contextual information associated with the physical object; filter the set of virtual objects to identify a subset of virtual objects from the set of virtual objects based on the contextual information; generate a virtual menu including the subset of virtual objects; determine a spatial location in the 3D environment for presenting the virtual menu based at least partly on the determined contextual information; and present, by the augmented reality display, the virtual menu at the spatial location.

In another embodiment, a method for generating virtual content in a three-dimensional (3D) environment of a user is disclosed. The method can comprise analyzing data acquired from a pose sensor to identify a pose of a user; identifying an interactable object in an 3D environment of the user based at least partly on the pose; receiving an indication to initiate an interaction with the interactable object; determining contextual information associated with the interactable object; selecting a subset of user interface operations from a set of available user interface operations on the interactable object based on the contextual information; and generating an instruction for presenting the subset of user interface operations in a 3D view to the user.

Details of one or more implementations of the subject matter described in this specification are set forth in the accompanying drawings and the description below. Other features, aspects, and advantages will become apparent from the description, the drawings, and the claims. Neither this summary nor the following detailed description purports to define or limit the scope of the inventive subject matter.

Figure 1:
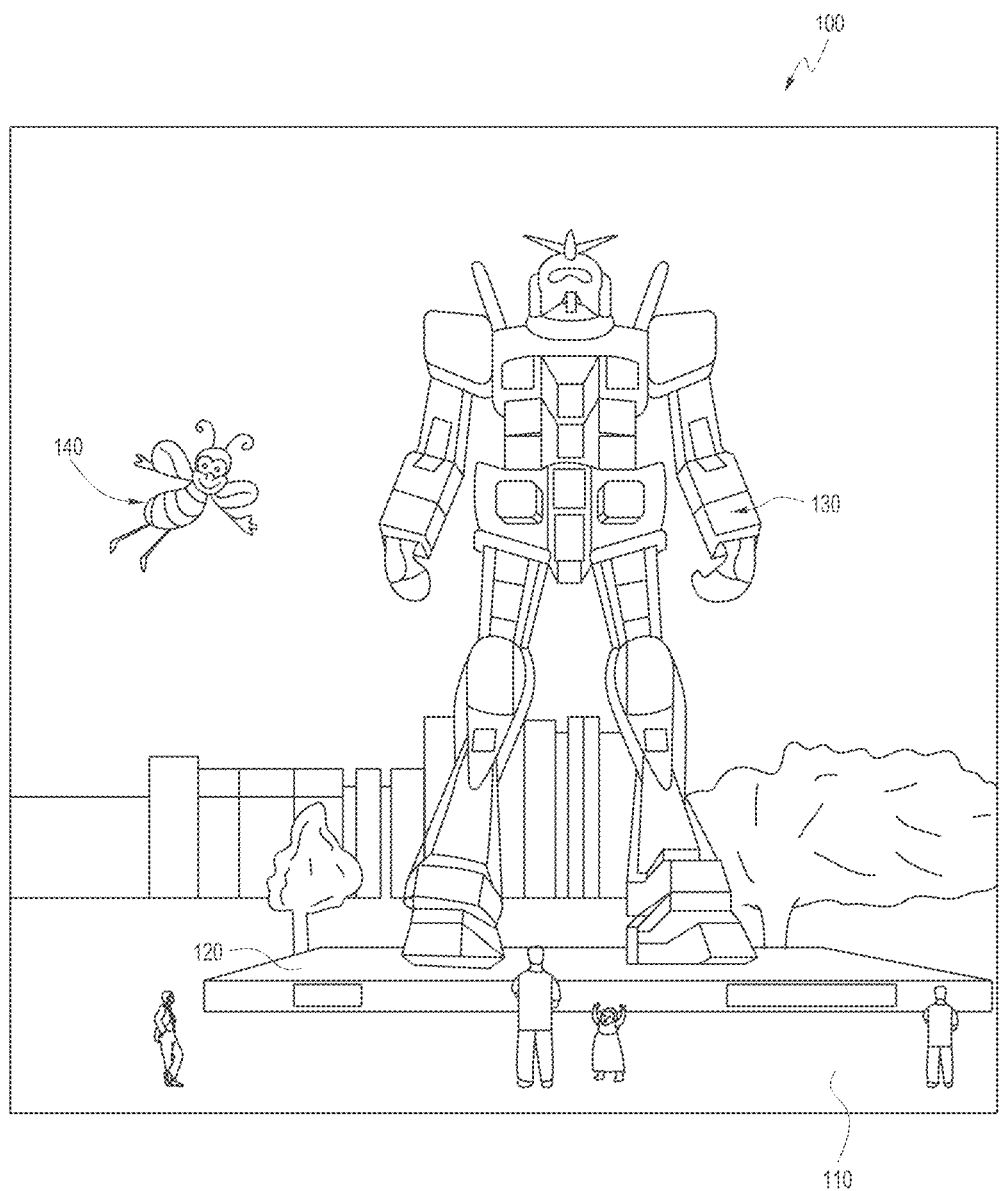
FIG. 1 depicts an illustration of a mixed reality scenario with certain virtual reality objects, and certain physical objects viewed by a person.

Throughout the drawings, reference numbers may be re-used to indicate correspondence between referenced elements. The drawings are provided to illustrate example embodiments described herein and are not intended to limit the scope of the disclosure. Additionally, the figures in the present disclosure are for illustration purposes and are not to scale.

DETAILED DESCRIPTION

Overview

Modern computer interfaces support a wide range of functionalities. However, a user may be flooded with the number of options and cannot quickly identify the objects of interest. In an AR/VR/MR environment, because the user's field of view (FOV) as perceived through an AR/VR/MR display of a wearable device may be smaller than the user's natural FOV, providing a relevant set of virtual objects becomes more challenging than the regular computing environment.

The wearable system described herein can ameliorate this problem by analyzing the user's environment and provide a smaller and more relevant subset of functions on the user interface. The wearable system may provide this subset of functions based on contextual information, such as, e.g., the user's environment or objects in the user's environment. The wearable system can recognize physical objects (such as tables and walls) and their relationships with the environment. For example, the wearable system can recognize that a cup should be placed on a table (instead of a wall) and a painting should be placed on a vertical wall (instead of a table). Based on this relationship, the wearable system can project a virtual cup on the table in the user's room and project a virtual painting on the vertical wall.

Besides the relationship between the objects and their environment, other factors such as orientations of the objects (e.g., horizontal or vertical), properties of the user's environment, and previous usage patterns (such as time, location, etc.) can also be used to determine which virtual objects should be shown by the wearable system. Properties of the user's environment can include whether it is a private environment where the user can interact with the wearable device in a relatively secure and private fashion (e.g., in the user's home or office) or a public environment where there may be others nearby (whom the user may not wish to view or overhear the user's interaction with the device). The distinction between a private or public environment is not exclusive. For example, a park may be a public environment if there are numerous people nearby the user but be a private environment if the user is alone or no others are nearby. The distinction may be made based at least partly on the number of nearby people, their proximity to the user, their relationship to the user (e.g., whether they are friends, family, or strangers), etc. Additionally or alternatively, the wearable system may identify a label (such as a fiducial mark) associated with an object. The label may contain information as to which virtual objects (such as items on a virtual menu) should be displayed for the object associated with the fiducial marker.

In some embodiments, the wearable system can also include a variety of physiological sensors. These sensors can measure or estimate the user's physiological parameters such as heart rate, respiratory rate, galvanic skin response, blood pressure, encephalographic state, and so on. These sensors may be used in conjunction with the inward-facing imaging system to determine the user's eye movement and pupil dilation, which may also be reflective of the physiological or psychological state of the user. The data acquired by the physiological sensors or the inward-facing imaging system can analyzed by the wearable system to determine the user's psychological state such as mood and interests. The wearable system can use the user's psychological state as part of the contextual information and present a set of virtual objects based at least partly on the user's psychological state.

Examples of 3D Display of a Wearable System

A wearable system (also referred to herein as an augmented reality (AR) system) can be configured to present 2D or 3D virtual images to a user. The images may be still images, frames of a video, or a video, in combination or the like. The wearable system can include a wearable device that can present a VR, AR, or MR environment, alone or in combination, for user interaction. The wearable device can be a head-mounted device (HMD) which is used interchangeably as an AR device (ARD). The wearable device may be in a form of a helmet, a pair of glasses, a headset, or any other wearable configuration.

FIG. 1 depicts an illustration of a mixed reality scenario with certain virtual reality objects, and certain physical objects viewed by a person. In FIG. 1, an MR scene 100 is depicted wherein a user of an MR technology sees a real-world park-like setting 110 featuring people, trees, buildings in the background, and a concrete platform 120. In addition to these items, the user of the MR technology also perceives that he "sees" a robot statue 130 standing upon the real-world platform 120, and a cartoon-like avatar character 140 flying by which seems to be a personification of a bumble bee, even though these elements do not exist in the real world.

In order for the 3D display to produce a true sensation of depth, and more specifically, a simulated sensation of surface depth, it may be desirable for each point in the display's visual field to generate an accommodative response corresponding to its virtual depth. If the accommodative response to a display point does not correspond to the virtual depth of that point, as determined by the binocular depth cues of convergence and stereopsis, the human eye may experience an accommodation conflict, resulting in unstable imaging, harmful eye strain, headaches, and, in the absence of accommodation information, almost a complete lack of surface depth.

VR, AR, and MR experiences can be provided by display systems having displays in which images corresponding to a plurality of depth planes are provided to a viewer. The images may be different for each depth plane (e.g., provide slightly different presentations of a scene or object) and may be separately focused by the viewer's eyes, thereby helping to provide the user with depth cues based on the accommodation of the eye required to bring into focus different image features for the scene located on different depth plane or based on observing different image features on different depth planes being out of focus. As discussed elsewhere herein, such depth cues provide credible perceptions of depth.

Figure 2:
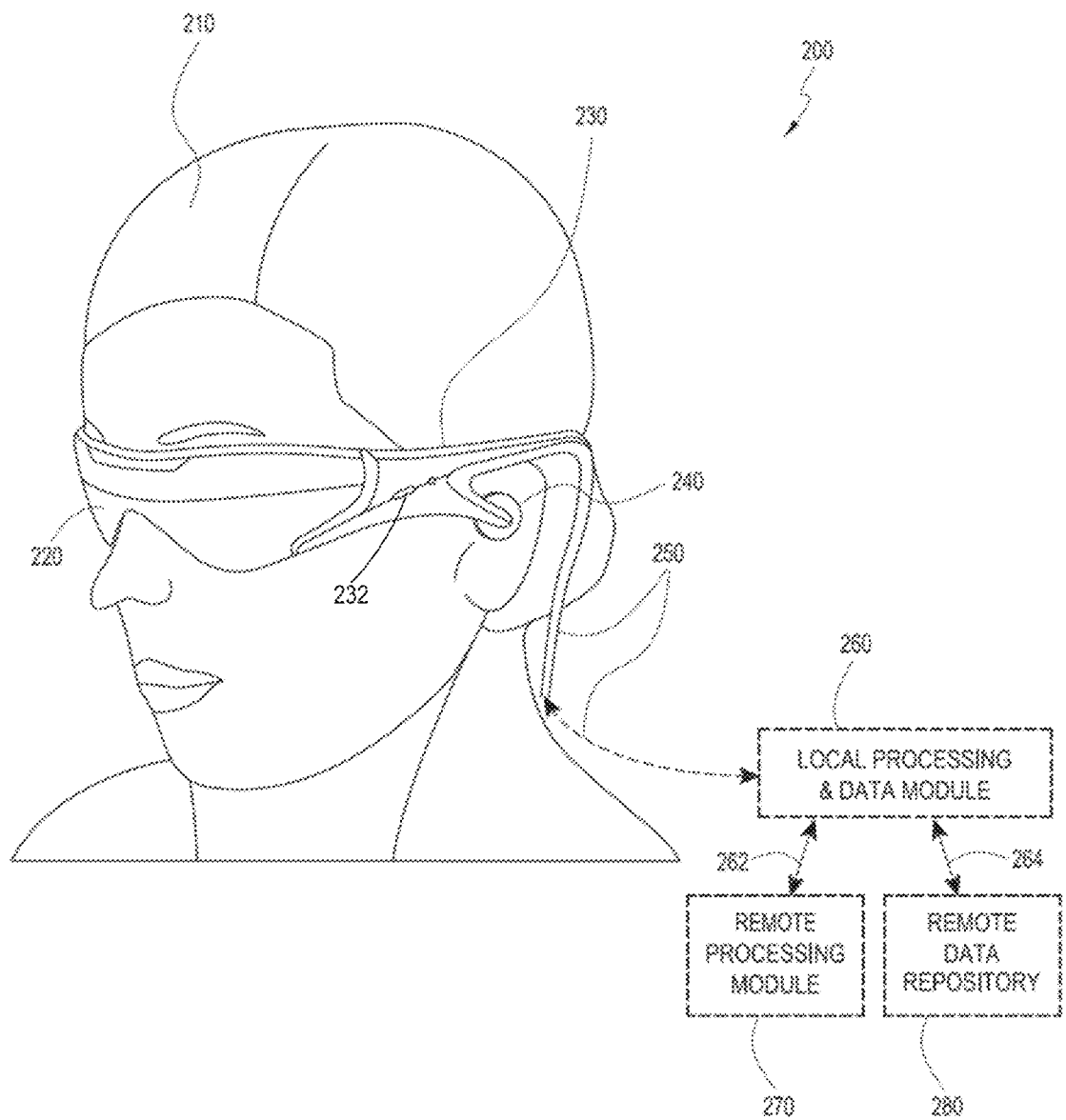
FIG. 2 schematically illustrates an example of a wearable system.

FIG. 2 illustrates an example of wearable system 200. The wearable system 200 includes a display 220, and various mechanical and electronic modules and systems to support the functioning of display 220. The display 220 may be coupled to a frame 230, which is wearable by a user, wearer, or viewer 210. The display 220 can be positioned in front of the eyes of the user 210. The display 220 can present AR/VR/MR content to a user. The display 220 can comprise a head mounted display (HMD) that is worn on the head of the user. In some embodiments, a speaker 240 is coupled to the frame 230 and positioned adjacent the ear canal of the user (in some embodiments, another speaker, not shown, is positioned adjacent the other ear canal of the user to provide for stereo/shapeable sound control).

The wearable system 200 can include an outward-facing imaging system 464 (shown in FIG. 4) which observes the world in the environment around the user. The wearable system 200 can also include an inward-facing imaging system 462 (shown in FIG. 4) which can track the eye movements of the user. The inward-facing imaging system may track either one eye's movements or both eyes' movements. The inward-facing imaging system 462 may be attached to the frame 230 and may be in electrical communication with the processing modules 260 or 270, which may process image information acquired by the inward-facing imaging system to determine, e.g., the pupil diameters or orientations of the eyes, eye movements or eye pose of the user 210.

As an example, the wearable system 200 can use the outward-facing imaging system 464 or the inward-facing imaging system 462 to acquire images of a pose of the user. The images may be still images, frames of a video, or a video, in combination or the like.

In some embodiments, the wearable system 200 can include one or more physiological sensors 232. Examples of such sensors include sensors configured for ophthalmic testing such as confocal microscopy sensors, electronystagmography (ENG) sensors, electrooculography (EOG) sensors, electroretinography (ERG) sensors, laser Doppler flowmetry (LDF) sensors, photoacoustic imaging and pressure reading sensors, two-photon excitation microscopy sensors, and/or ultrasound sensors. Other examples of sensors include sensors configured for other electrodiagnostic technologies, such as electrocardiography (ECG) sensors, electroencephalography (EEG) sensors, electromyography (EMG) sensors, electrophysiological testing (EP) sensors, event-related potential (ERP) sensors, functional near-infrared spectroscopy (fNIR) sensors, low-resolution brain electromagnetic tomography (LORETA) sensors, and/or optical coherence tomography (OCT) sensors. Yet other examples of sensors 232 include physiological sensors such as blood glucose sensors, blood pressure sensors, electrodermal activity sensors, photoplethysmography equipment, sensing equipment for computer-aided auscultation, a galvanic skin response sensor, and/or a body temperature sensor. Sensors 232 may also include $CO_2$ monitoring sensors, respiratory rate sensors, end-title $CO_2$ sensors, and/or breathalyzers.

An example of a sensor 232 is schematically illustrated as being connected to the frame 230. This connection may take the form of a physical attachment to the frame 230 and may be anywhere on the frame 230. As an example, the sensor 232 may be mounted on the frame 230 so as to be disposed adjacent the user's temple or at a point of contact between the frame 230 and the user's nose. As another example, the sensor 232 may be disposed at the portion of the frame 230 extending over the user's ears. In some other embodiments, the sensors 232 may extend away from the frame 230 to contact the user 210. For example, the sensor 232 may touch a portion of the user's body (such as the user's arms) and connect to the frame 230 via a wired connection. In other embodiments, the sensors 232 may not be physically attached to the frame 230; rather, the sensors 232 may communicate with the wearable system 200 via wireless connections. In some embodiments, the wearable system 200 may have the form of a helmet and the sensor 232 may be disposed toward the crown or sides of the user's head.

In some implementations, the sensor 232 takes a direct measurement of a physiological parameter that is used by the wearable system as contextual information. For example, a heart rate sensor may directly measure the user's heart rate. In other implementations, the sensor 232 (or a group of sensors) may take measurements that are used to estimate another physiological parameter. For example, stress may be estimated as a combination of a heart rate measurement and a galvanic skin response measurement. Statistical techniques can be applied to sensor data to estimate the physiological (or psychological) state. As an example, sensor data can be combined using machine learning techniques (e.g., decision trees, neural networks, support vector machines, Bayesian techniques) to estimate a state of the user. The estimation of the state may provide a binary state (e.g., stressed or baseline), multiple states (e.g., stressed, baseline, or relaxed), or a probabilistic measure (e.g., a probability the user is stressed). The physiological or psychological state can reflect any emotional state of the user for example: anxiety, stress, anger, affection, boredom, despair or depression, happiness, sadness, loneliness, shock or surprise, and so forth.

The display 220 can be operatively coupled 250, such as by a wired lead or wireless connectivity, to a local data processing module 260 which may be mounted in a variety of configurations, such as fixedly attached to the frame 230, fixedly attached to a helmet or hat worn by the user, embedded in headphones, or otherwise removably attached to the user 210 (e.g., in a backpack-style configuration, in a belt-coupling style configuration).

The local processing and data module 260 may comprise a hardware processor, as well as digital memory, such as non-volatile memory (e.g., flash memory), both of which may be utilized to assist in the processing, caching, and storage of data. The data may include data a) captured from sensors (which may be, e.g., operatively coupled to the frame 230 or otherwise attached to the user 210), such as image capture devices (e.g., cameras in the inward-facing imaging system or the outward-facing imaging system), microphones, inertial measurement units (IMUs), accelerometers, compasses, global positioning system (GPS) units, radio devices, or gyroscopes; or b) acquired or processed using remote processing module 270 or remote data repository 280, possibly for passage to the display 220 after such processing or retrieval. The local processing and data module 260 may be operatively coupled by communication links 262 or 264, such as via wired or wireless communication links, to the remote processing module 270 or remote data repository 280 such that these remote modules are available as resources to the local processing and data module 260. In addition, remote processing module 280 and remote data repository 280 may be operatively coupled to each other.

In some embodiments, the remote processing module 270 may comprise one or more hardware processors configured to analyze and process data and/or image information. In some embodiments, the remote data repository 280 may comprise a digital data storage facility, which may be available through the internet or other networking configuration in a "cloud" resource configuration. In some embodiments, all data is stored and all computations are performed in the local processing and data module, allowing fully autonomous use from a remote module.

The human visual system is complicated and providing a realistic perception of depth is challenging. Without being limited by theory, it is believed that viewers of an object may perceive the object as being three-dimensional due to a combination of vergence and accommodation. Vergence movements (i.e., rolling movements of the pupils toward or away from each other to converge the lines of sight of the eyes to fixate upon an object) of the two eyes relative to each other are closely associated with focusing (or "accommodation") of the lenses of the eyes. Under normal conditions, changing the focus of the lenses of the eyes, or accommodating the eyes, to change focus from one object to another object at a different distance will automatically cause a matching change in vergence to the same distance, under a relationship known as the "accommodation-vergence reflex." Likewise, a change in vergence will trigger a matching change in accommodation, under normal conditions. Display systems that provide a better match between accommodation and vergence may form more realistic and comfortable simulations of three-dimensional imagery.

Figure 3:
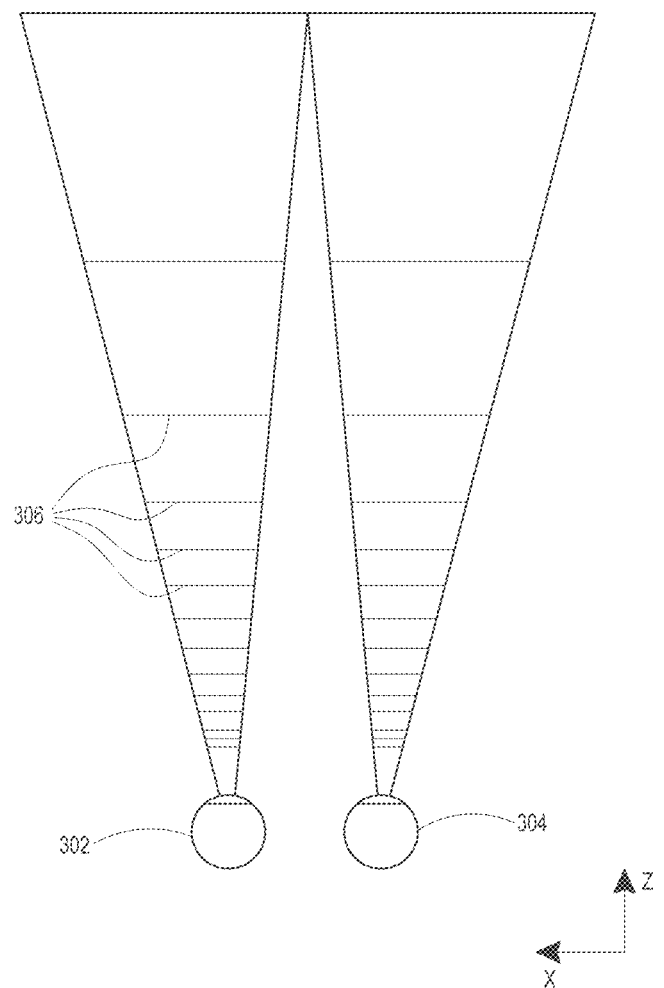
FIG. 3 schematically illustrates aspects of an approach for simulating three-dimensional imagery using multiple depth planes.

FIG. 3 illustrates aspects of an approach for simulating a three-dimensional imagery using multiple depth planes. With reference to FIG. 3, objects at various distances from eyes 302 and 304 on the z-axis are accommodated by the eyes 302 and 304 so that those objects are in focus. The eyes 302 and 304 assume particular accommodated states to bring into focus objects at different distances along the z-axis. Consequently, a particular accommodated state may be said to be associated with a particular one of depth planes 306, with has an associated focal distance, such that objects or parts of objects in a particular depth plane are in focus when the eye is in the accommodated state for that depth plane. In some embodiments, three-dimensional imagery may be simulated by providing different presentations of an image for each of the eyes 302 and 304, and also by providing different presentations of the image corresponding to each of the depth planes. While shown as being separate for clarity of illustration, it will be appreciated that the fields of view of the eyes 302 and 304 may overlap, for example, as distance along the z-axis increases. In addition, while shown as flat for the ease of illustration, it will be appreciated that the contours of a depth plane may be curved in physical space, such that all features in a depth plane are in focus with the eye in a particular accommodated state. Without being limited by theory, it is believed that the human eye typically can interpret a finite number of depth planes to provide depth perception. Consequently, a highly believable simulation of perceived depth may be achieved by providing, to the eye, different presentations of an image corresponding to each of these limited number of depth planes.

Waveguide Stack Assembly

Figure 4:
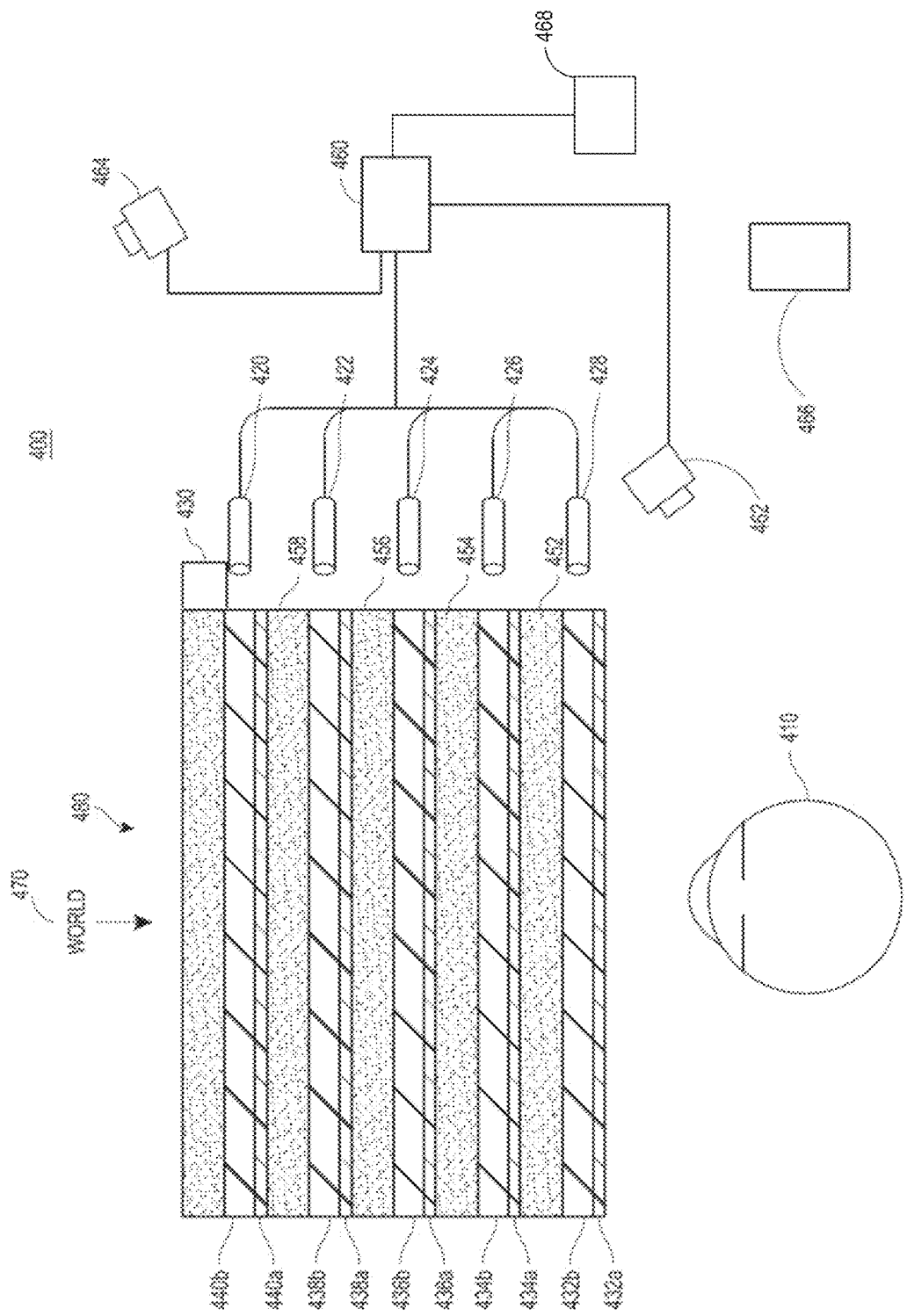
FIG. 4 schematically illustrates an example of a waveguide stack for outputting image information to a user.

FIG. 4 illustrates an example of a waveguide stack for outputting image information to a user. A wearable system 400 includes a stack of waveguides, or stacked waveguide assembly 480 that may be utilized to provide three-dimensional perception to the eye/brain using a plurality of waveguides 432b, 434b, 436b, 438b, 4400b. In some embodiments, the wearable system 400 may correspond to wearable system 200 of FIG. 2, with FIG. 4 schematically showing some parts of that wearable system 200 in greater detail. For example, in some embodiments, the waveguide assembly 480 may be integrated into the display 220 of FIG. 2.

With continued reference to FIG. 4, the waveguide assembly 480 may also include a plurality of features 458, 456, 454, 452 between the waveguides. In some embodiments, the features 458, 456, 454, 452 may be lenses. In other embodiments, the features 458, 456, 454, 452 may not be lenses. Rather, they may simply be spacers (e.g., cladding layers or structures for forming air gaps).

The waveguides 432b, 434b, 436b, 438b, 440b or the plurality of lenses 458, 456, 454, 452 may be configured to send image information to the eye with various levels of wavefront curvature or light ray divergence. Each waveguide level may be associated with a particular depth plane and may be configured to output image information corresponding to that depth plane. Image injection devices 420, 422, 424, 426, 428 may be utilized to inject image information into the waveguides 440b, 438b, 436b, 434b, 432b, each of which may be configured to distribute incoming light across each respective waveguide, for output toward the eye 410. Light exits an output surface of the image injection devices 420, 422, 424, 426, 428 and is injected into a corresponding input edge of the waveguides 440b, 438b, 436b, 434b, 432b. In some embodiments, a single beam of light (e.g., a collimated beam) may be injected into each waveguide to output an entire field of cloned collimated beams that are directed toward the eye 410 at particular angles (and amounts of divergence) corresponding to the depth plane associated with a particular waveguide.

In some embodiments, the image injection devices 420, 422, 424, 426, 428 are discrete displays that each produce image information for injection into a corresponding waveguide 440b, 438b, 436b, 434b, 432b, respectively. In some other embodiments, the image injection devices 420, 422, 424, 426, 428 are the output ends of a single multiplexed display which may, e.g., pipe image information via one or more optical conduits (such as fiber optic cables) to each of the image injection devices 420, 422, 424, 426, 428.

A controller 460 controls the operation of the stacked waveguide assembly 480 and the image injection devices 420, 422, 424, 426, 428. The controller 460 includes programming (e.g., instructions in a non-transitory computer-readable medium) that regulates the timing and provision of image information to the waveguides 440b, 438b, 436b, 434b, 432b. In some embodiments, the controller 460 may be a single integral device, or a distributed system connected by wired or wireless communication channels. The controller 460 may be part of the processing modules 260 or 270 (illustrated in FIG. 2) in some embodiments.

The waveguides 440b, 438b, 436b, 434b, 432b may be configured to propagate light within each respective waveguide by total internal reflection (TIR). The waveguides 440b, 438b, 436b, 434b, 432b may each be planar or have another shape (e.g., curved), with major top and bottom surfaces and edges extending between those major top and bottom surfaces. In the illustrated configuration, the waveguides 440b, 438b, 436b, 434b, 432b may each include light extracting optical elements 440a, 438a, 436a, 434a, 432a that are configured to extract light out of a waveguide by redirecting the light, propagating within each respective waveguide, out of the waveguide to output image information to the eye 410. Extracted light may also be referred to as outcoupled light, and light extracting optical elements may also be referred to as outcoupling optical elements. An extracted beam of light is outputted by the waveguide at locations at which the light propagating in the waveguide strikes a light redirecting element. The light extracting optical elements (440a, 438a, 436a, 434a, 432a) may, for example, be reflective or diffractive optical features. While illustrated disposed at the bottom major surfaces of the waveguides 440b, 438b, 436b, 434b, 432b for ease of description and drawing clarity, in some embodiments, the light extracting optical elements 440a, 438a, 436a, 434a, 432a may be disposed at the top or bottom major surfaces, or may be disposed directly in the volume of the waveguides 440b, 438b, 436b, 434b, 432b. In some embodiments, the light extracting optical elements 440a, 438a, 436a, 434a, 432a may be formed in a layer of material that is attached to a transparent substrate to form the waveguides 440b, 438b, 436b, 434b, 432b. In some other embodiments, the waveguides 440b, 438b, 436b, 434b, 432b may be a monolithic piece of material and the light extracting optical elements 440a, 438a, 436a, 434a, 432a may be formed on a surface or in the interior of that piece of material.

With continued reference to FIG. 4, as discussed herein, each waveguide 440b, 438b, 436b, 434b, 432b is configured to output light to form an image corresponding to a particular depth plane. For example, the waveguide 432b nearest the eye may be configured to deliver collimated light, as injected into such waveguide 432b, to the eye 410. The collimated light may be representative of the optical infinity focal plane. The next waveguide up 434b may be configured to send out collimated light which passes through the first lens 452 (e.g., a negative lens) before it can reach the eye 410. First lens 452 may be configured to create a slight convex wavefront curvature so that the eye/brain interprets light coming from that next waveguide up 434b as coming from a first focal plane closer inward toward the eye 410 from optical infinity. Similarly, the third up waveguide 436b passes its output light through both the first lens 452 and second lens 454 before reaching the eye 410. The combined optical power of the first and second lenses 452 and 454 may be configured to create another incremental amount of wavefront curvature so that the eye/brain interprets light coming from the third waveguide 436b as coming from a second focal plane that is even closer inward toward the person from optical infinity than was light from the next waveguide up 434b.

The other waveguide layers (e.g., waveguides 438b, 440b) and lenses (e.g., lenses 456, 458) are similarly configured, with the highest waveguide 440b in the stack sending its output through all of the lenses between it and the eye for an aggregate focal power representative of the closest focal plane to the person. To compensate for the stack of lenses 458, 456, 454, 452 when viewing/interpreting light coming from the world 470 on the other side of the stacked waveguide assembly 480, a compensating lens layer 430 may be disposed at the top of the stack to compensate for the aggregate power of the lens stack 458, 456, 454, 452 below. Such a configuration provides as many perceived focal planes as there are available waveguide/lens pairings. Both the light extracting optical elements of the waveguides and the focusing aspects of the lenses may be static (e.g., not dynamic or electro-active). In some alternative embodiments, either or both may be dynamic using electro-active features.

With continued reference to FIG. 4, the light extracting optical elements 440a, 438a, 436a, 434a, 432a may be configured to both redirect light out of their respective waveguides and to output this light with the appropriate amount of divergence or collimation for a particular depth plane associated with the waveguide. As a result, waveguides having different associated depth planes may have different configurations of light extracting optical elements, which output light with a different amount of divergence depending on the associated depth plane. In some embodiments, as discussed herein, the light extracting optical elements 440a, 438a, 436a, 434a, 432a may be volumetric or surface features, which may be configured to output light at specific angles. For example, the light extracting optical elements 440a, 438a, 436a, 434a, 432a may be volume holograms, surface holograms, and/or diffraction gratings. Light extracting optical elements, such as diffraction gratings, are described in U.S. Patent Publication No. 2015/0178939, published Jun. 25, 2015, which is incorporated by reference herein in its entirety.

In some embodiments, the light extracting optical elements 440a, 438a, 436a, 434a, 432a are diffractive features that form a diffraction pattern, or "diffractive optical element" (also referred to herein as a "DOE"). Preferably, the DOE has a relatively low diffraction efficiency so that only a portion of the light of the beam is deflected away toward the eye 410 with each intersection of the DOE, while the rest continues to move through a waveguide via total internal reflection. The light carrying the image information can thus be divided into a number of related exit beams that exit the waveguide at a multiplicity of locations and the result is a fairly uniform pattern of exit emission toward the eye 304 for this particular collimated beam bouncing around within a waveguide.

In some embodiments, one or more DOEs may be switchable between "on" state in which they actively diffract, and "off" state in which they do not significantly diffract. For instance, a switchable DOE may comprise a layer of polymer dispersed liquid crystal, in which microdroplets comprise a diffraction pattern in a host medium, and the refractive index of the microdroplets can be switched to substantially match the refractive index of the host material (in which case the pattern does not appreciably diffract incident light) or the microdroplet can be switched to an index that does not match that of the host medium (in which case the pattern actively diffracts incident light).

In some embodiments, the number and distribution of depth planes or depth of field may be varied dynamically based on the pupil sizes or orientations of the eyes of the viewer. Depth of field may change inversely with a viewer's pupil size. As a result, as the sizes of the pupils of the viewer's eyes decrease, the depth of field increases such that one plane that is not discernible because the location of that plane is beyond the depth of focus of the eye may become discernible and appear more in focus with reduction of pupil size and commensurate with the increase in depth of field. Likewise, the number of spaced apart depth planes used to present different images to the viewer may be decreased with the decreased pupil size. For example, a viewer may not be able to clearly perceive the details of both a first depth plane and a second depth plane at one pupil size without adjusting the accommodation of the eye away from one depth plane and to the other depth plane. These two depth planes may, however, be sufficiently in focus at the same time to the user at another pupil size without changing accommodation.

In some embodiments, the display system may vary the number of waveguides receiving image information based upon determinations of pupil size or orientation, or upon receiving electrical signals indicative of particular pupil size or orientation. For example, if the user's eyes are unable to distinguish between two depth planes associated with two waveguides, then the controller 460 may be configured or programmed to cease providing image information to one of these waveguides. Advantageously, this may reduce the processing burden on the system, thereby increasing the responsiveness of the system. In embodiments in which the DOEs for a waveguide are switchable between the on and off states, the DOEs may be switched to the off state when the waveguide does receive image information.

In some embodiments, it may be desirable to have an exit beam meet the condition of having a diameter that is less than the diameter of the eye of a viewer. However, meeting this condition may be challenging in view of the variability in size of the viewer's pupils. In some embodiments, this condition is met over a wide range of pupil sizes by varying the size of the exit beam in response to determinations of the size of the viewer's pupil. For example, as the pupil size decreases, the size of the exit beam may also decrease. In some embodiments, the exit beam size may be varied using a variable aperture.

The wearable system 400 can include an outward-facing imaging system 464 (e.g., a digital camera) that images a portion of the world 470. This portion of the world 470 may be referred to as the field of view (FOV) of a world camera and the imaging system 464 is sometimes referred to as an FOV camera. The entire region available for viewing or imaging by a viewer may be referred to as the field of regard (FOR). The FOR may include $4\pi c$ steradians of solid angle surrounding the wearable system 400 because the wearer can move his body, head, or eyes to perceive substantially any direction in space. In other contexts, the wearer's movements may be more constricted, and accordingly the wearer's FOR may subtend a smaller solid angle. Images obtained from the outward-facing imaging system 464 can be used to track gestures made by the user (e.g., hand or finger gestures), detect objects in the world 470 in front of the user, and so forth.

The wearable system 400 can also include an inward-facing imaging system 466 (e.g., a digital camera), which observes the movements of the user, such as the eye movements and the facial movements. The inward-facing imaging system 466 may be used to capture images of the eye 410 to determine the size and/or orientation of the pupil of the eye 304. The inward-facing imaging system 466 can be used to obtain images for use in determining the direction the user is looking (e.g., eye pose) or for biometric identification of the user (e.g., via iris identification). In some embodiments, at least one camera may be utilized for each eye, to separately determine the pupil size or eye pose of each eye independently, thereby allowing the presentation of image information to each eye to be dynamically tailored to that eye. In some other embodiments, the pupil diameter or orientation of only a single eye 410 (e.g., using only a single camera per pair of eyes) is determined and assumed to be similar for both eyes of the user. The images obtained by the inward-facing imaging system 466 may be analyzed to determine the user's eye pose or mood, which can be used by the wearable system 400 to decide which audio or visual content should be presented to the user. The wearable system 400 may also determine head pose (e.g., head position or head orientation) using sensors such as IMUs, accelerometers, gyroscopes, etc.

The wearable system 400 can include a user input device 466 by which the user can input commands to the controller 460 to interact with the wearable system 400. For example, the user input device 466 can include a trackpad, a touchscreen, a joystick, a multiple degree-of-freedom (DOF) controller, a capacitive sensing device, a game controller, a keyboard, a mouse, a directional pad (D-pad), a wand, a haptic device, a totem (e.g., functioning as a virtual user input device), and so forth. A multi-DOF controller can sense user input in some or all possible translations (e.g., left/right, forward/backward, or up/down) or rotations (e.g., yaw, pitch, or roll) of the controller. A multi-DOF controller which supports the translation movements may be referred to as a 3DOF while a multi-DOF controller which supports the translations and rotations may be referred to as 6DOF. In some cases, the user may use a finger (e.g., a thumb) to press or swipe on a touch-sensitive input device to provide input to the wearable system 400 (e.g., to provide user input to a user interface provided by the wearable system 400). The user input device 466 may be held by the user's hand during the use of the wearable system 400. The user input device 466 can be in wired or wireless communication with the wearable system 400.

The wearable system 400 can also include physiological sensors 468 (which may be example embodiments of the sensors 232 in FIG. 2) configured to measure the user's physiological parameters, such as heart rate, galvanic skin response, respiratory rate, and so on. The physiological sensors may communicate the acquired data to the controller 460. The controller 460 can use the data acquired by the physiological sensors alone or in combination with data obtained by other sensors to determine the user's physiological and/or psychological state. For example, the controller 460 can combine the heart rate data acquired by the physiological sensors 468 with pupil dilation information acquired by the inward-facing imaging system 462 to determine whether the user is happy or angry. As described further below, the wearable system can selectively present virtual content to the user based on the user's physiological state and/or the psychological state.

Figure 5:
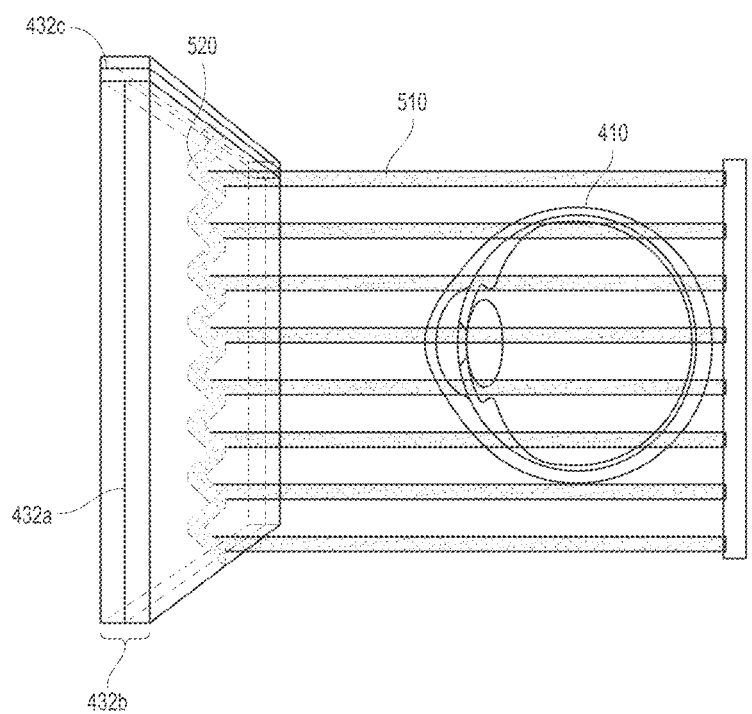
FIG. 5 shows example exit beams that may be outputted by a waveguide.

FIG. 5 shows an example of exit beams outputted by a waveguide. One waveguide is illustrated, but it will be appreciated that other waveguides in the waveguide assembly 480 may function similarly, where the waveguide assembly 480 includes multiple waveguides. Light 520 is injected into the waveguide 432b at the input edge 432c of the waveguide 432b and propagates within the waveguide 432b by TIR. At points where the light 520 impinges on the DOE 432a, a portion of the light exits the waveguide as exit beams 510. The exit beams 510 are illustrated as substantially parallel but they may also be redirected to propagate to the eye 410 at an angle (e.g., forming divergent exit beams), depending on the depth plane associated with the waveguide 432b. It will be appreciated that substantially parallel exit beams may be indicative of a waveguide with light extracting optical elements that outcouple light to form images that appear to be set on a depth plane at a large distance (e.g., optical infinity) from the eye 410. Other waveguides or other sets of light extracting optical elements may output an exit beam pattern that is more divergent, which would require the eye 410 to accommodate to a closer distance to bring it into focus on the retina and would be interpreted by the brain as light from a distance closer to the eye 410 than optical infinity.

Figure 6:
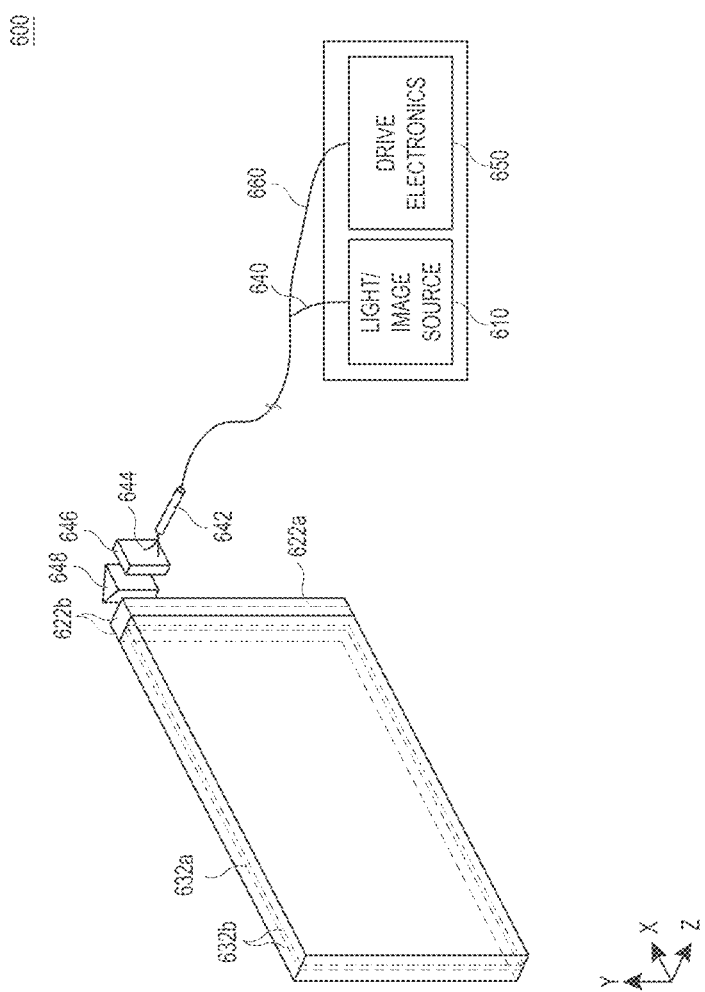
FIG. 6 is a schematic diagram showing an optical system including a waveguide apparatus, an optical coupler subsystem to optically couple light to or from the waveguide apparatus, and a control subsystem, used in the generation of a multi-focal volumetric display, image, or light field.

FIG. 6 is a schematic diagram showing an optical system including a waveguide apparatus, an optical coupler subsystem to optically couple light to or from the waveguide apparatus, and a control subsystem, used in the generation of a multi-focal volumetric display, image, or light field. The optical system can include a waveguide apparatus, an optical coupler subsystem to optically couple light to or from the waveguide apparatus, and a control subsystem. The optical system can be used to generate a multi-focal volumetric, image, or light field. The optical system can include one or more primary planar waveguides 632a (only one is shown in FIG. 6) and one or more DOEs 632b associated with each of at least some of the primary waveguides 632a. The planar waveguides 632b can be similar to the waveguides 432b, 434b, 436b, 438b, 440b discussed with reference to FIG. 4. The optical system may employ a distribution waveguide apparatus to relay light along a first axis (vertical or Y-axis in view of FIG. 6), and expand the light's effective exit pupil along the first axis (e.g., Y-axis). The distribution waveguide apparatus may, for example, include a distribution planar waveguide 622b and at least one DOE 622a (illustrated by double dash-dot line) associated with the distribution planar waveguide 622b. The distribution planar waveguide 622b may be similar or identical in at least some respects to the primary planar waveguide 632b, having a different orientation therefrom. Likewise, at least one DOE 622a may be similar or identical in at least some respects to the DOE 632a. For example, the distribution planar waveguide 622b or DOE 622a may be comprised of the same materials as the primary planar waveguide 632b or DOE 632a, respectively. Embodiments of the optical display system 600 shown in FIG. 6 can be integrated into the wearable system 200 shown in FIG. 2.

The relayed and exit-pupil expanded light may be optically coupled from the distribution waveguide apparatus into the one or more primary planar waveguides 632b. The primary planar waveguide 632b can relay light along a second axis, preferably orthogonal to first axis (e.g., horizontal or X-axis in view of FIG. 6). Notably, the second axis can be a non-orthogonal axis to the first axis. The primary planar waveguide 632b expands the light's effective exit pupil along that second axis (e.g., X-axis). For example, the distribution planar waveguide 622b can relay and expand light along the vertical or Y-axis, and pass that light to the primary planar waveguide 632b which can relay and expand light along the horizontal or X-axis.

The optical system may include one or more sources of colored light (e.g., red, green, and blue laser light) 610 which may be optically coupled into a proximal end of a single mode optical fiber 640. A distal end of the optical fiber 640 may be threaded or received through a hollow tube 642 of piezoelectric material. The distal end protrudes from the tube 642 as fixed-free flexible cantilever 644. The piezoelectric tube 642 can be associated with four quadrant electrodes (not illustrated). The electrodes may, for example, be plated on the outside, outer surface or outer periphery or diameter of the tube 642. A core electrode (not illustrated) may also be located in a core, center, inner periphery or inner diameter of the tube 642.

Drive electronics 650, for example electrically coupled via wires 660, drive opposing pairs of electrodes to bend the piezoelectric tube 642 in two axes independently. The protruding distal tip of the optical fiber 644 has mechanical modes of resonance. The frequencies of resonance can depend upon a diameter, length, and material properties of the optical fiber 644. By vibrating the piezoelectric tube 642 near a first mode of mechanical resonance of the fiber cantilever 644, the fiber cantilever 644 can be caused to vibrate, and can sweep through large deflections.

By stimulating resonant vibration in two axes, the tip of the fiber cantilever 644 is scanned biaxially in an area filling two-dimensional (2D) scan. By modulating an intensity of light source(s) 610 in synchrony with the scan of the fiber cantilever 644, light emerging from the fiber cantilever 644 can form an image. Descriptions of such a set up are provided in U.S. Patent Publication No. 2014/0003762, which is incorporated by reference herein in its entirety.

A component of an optical coupler subsystem can collimate the light emerging from the scanning fiber cantilever 644. The collimated light can be reflected by mirrored surface 648 into the narrow distribution planar waveguide 622b which contains the at least one diffractive optical element (DOE) 622a. The collimated light can propagate vertically (relative to the view of FIG. 6) along the distribution planar waveguide 622b by TIR, and in doing so repeatedly intersects with the DOE 622a. The DOE 622a preferably has a low diffraction efficiency. This can cause a fraction (e.g., 10%) of the light to be diffracted toward an edge of the larger primary planar waveguide 632b at each point of intersection with the DOE 622a, and a fraction of the light to continue on its original trajectory down the length of the distribution planar waveguide 622b via TIR.

At each point of intersection with the DOE 622a, additional light can be diffracted toward the entrance of the primary waveguide 632b. By dividing the incoming light into multiple outcoupled sets, the exit pupil of the light can be expanded vertically by the DOE 4 in the distribution planar waveguide 622b. This vertically expanded light coupled out of distribution planar waveguide 622b can enter the edge of the primary planar waveguide 632b.

Light entering primary waveguide 632b can propagate horizontally (relative to the view of FIG. 6) along the primary waveguide 632b via TIR. As the light intersects with DOE 632a at multiple points as it propagates horizontally along at least a portion of the length of the primary waveguide 632b via TIR. The DOE 632a may advantageously be designed or configured to have a phase profile that is a summation of a linear diffraction pattern and a radially symmetric diffractive pattern, to produce both deflection and focusing of the light. The DOE 632a may advantageously have a low diffraction efficiency (e.g., 10%), so that only a portion of the light of the beam is deflected toward the eye of the view with each intersection of the DOE 632a while the rest of the light continues to propagate through the primary waveguide 632b via TIR.

At each point of intersection between the propagating light and the DOE 632a, a fraction of the light is diffracted toward the adjacent face of the primary waveguide 632b allowing the light to escape the TIR, and emerge from the face of the primary waveguide 632b. In some embodiments, the radially symmetric diffraction pattern of the DOE 632a additionally imparts a focus level to the diffracted light, both shaping the light wavefront (e.g., imparting a curvature) of the individual beam as well as steering the beam at an angle that matches the designed focus level.

Accordingly, these different pathways can cause the light to be coupled out of the primary planar waveguide 632b by a multiplicity of DOEs 632a at different angles, focus levels, and/or yielding different fill patterns at the exit pupil. Different fill patterns at the exit pupil can be beneficially used to create a light field display with multiple depth planes. Each layer in the waveguide assembly or a set of layers (e.g., 3 layers) in the stack may be employed to generate a respective color (e.g., red, blue, green). Thus, for example, a first set of three adjacent layers may be employed to respectively produce red, blue and green light at a first focal depth. A second set of three adjacent layers may be employed to respectively produce red, blue and green light at a second focal depth. Multiple sets may be employed to generate a full 3D or 4D color image light field with various focal depths.

Other Components of the Wearable System

In many implementations, the wearable system may include other components in addition or in alternative to the components of the wearable system described above. The wearable system may, for example, include one or more haptic devices or components. The haptic devices or components may be operable to provide a tactile sensation to a user. For example, the haptic devices or components may provide a tactile sensation of pressure or texture when touching virtual content (e.g., virtual objects, virtual tools, other virtual constructs). The tactile sensation may replicate a feel of a physical object which a virtual object represents, or may replicate a feel of an imagined object or character (e.g., a dragon) which the virtual content represents. In some implementations, haptic devices or components may be worn by the user (e.g., a user wearable glove). In some implementations, haptic devices or components may be held by the user.

The wearable system may, for example, include one or more physical objects which are manipulable by the user to allow input or interaction with the wearable system. These physical objects may be referred to herein as totems. Some totems may take the form of inanimate objects, such as for example, a piece of metal or plastic, a wall, a surface of table. In certain implementations, the totems may not actually have any physical input structures (e.g., keys, triggers, joystick, trackball, rocker switch). Instead, the totem may simply provide a physical surface, and the wearable system may render a user interface so as to appear to a user to be on one or more surfaces of the totem. For example, the wearable system may render an image of a computer keyboard and trackpad to appear to reside on one or more surfaces of a totem. For example, the wearable system may render a virtual computer keyboard and virtual trackpad to appear on a surface of a thin rectangular plate of aluminum which serves as a totem. The rectangular plate does not itself have any physical keys or trackpad or sensors. However, the wearable system may detect user manipulation or interaction or touches with the rectangular plate as selections or inputs made via the virtual keyboard or virtual trackpad. The user input device 466 (shown in FIG. 4) may be an embodiment of a totem, which may include a trackpad, a touchpad, a trigger, a joystick, a trackball, a rocker or virtual switch, a mouse, a keyboard, a multi-degree-of-freedom controller, or another physical input device. A user may use the totem, alone or in combination with poses, to interact with the wearable system or other users.

Examples of haptic devices and totems usable with the wearable devices, HMD, and display systems of the present disclosure are described in U.S. Patent Publication No. 2015/0016777, which is incorporated by reference herein in its entirety.

Example Wearable Systems, Environments, and Interfaces

A wearable system may employ various mapping related techniques in order to achieve high depth of field in the rendered light fields. In mapping out the virtual world, it is advantageous to know all the features and points in the real world to accurately portray virtual objects in relation to the real world. To this end, FOV images captured from users of the wearable system can be added to a world model by including new pictures that convey information about various points and features of the real world. For example, the wearable system can collect a set of map points (such as 2D points or 3D points) and find new map points to render a more accurate version of the world model. The world model of a first user can be communicated (e.g., over a network such as a cloud network) to a second user so that the second user can experience the world surrounding the first user.

Figure 7:
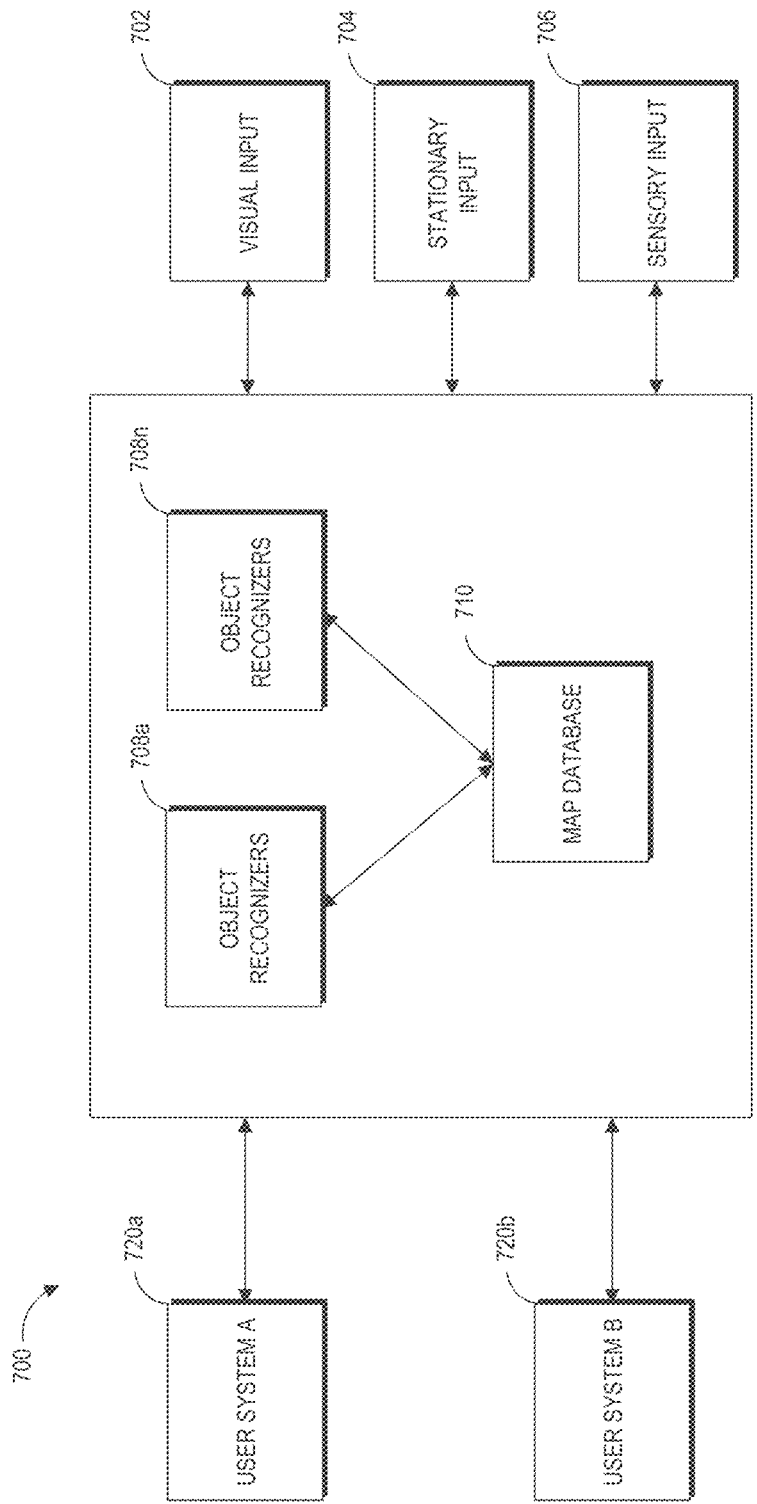
FIG. 7 is a block diagram of an example of a wearable system.

FIG. 7 is a block diagram of an example of an MR environment 700. The MR environment 700 may be configured to receive input (e.g., visual input 702 from the user's wearable system, stationary input 704 such as room cameras, sensory input 706 from various sensors, gestures, totems, eye tracking, user input from the user input device 466 etc.) from one or more user wearable systems (e.g., wearable system 200 or display system 220) or stationary room systems (e.g., room cameras, etc.). The wearable systems can use various sensors (e.g., accelerometers, gyroscopes, temperature sensors, movement sensors, depth sensors, GPS sensors, inward-facing imaging system, outward-facing imaging system, etc.) to determine the location and various other attributes of the environment of the user. This information may further be supplemented with information from stationary cameras in the room that may provide images or various cues from a different point of view. The image data acquired by the cameras (such as the room cameras and/or the cameras of the outward-facing imaging system) may be reduced to a set of mapping points.

One or more object recognizers 708 can crawl through the received data (e.g., the collection of points) and recognize or map points, tag images, attach semantic information to objects with the help of a map database 710. The map database 710 may comprise various points collected over time and their corresponding objects. The various devices and the map database can be connected to each other through a network (e.g., LAN, WAN, etc.) to access the cloud.

Based on this information and collection of points in the map database, the object recognizers 708*a* to 708*n* may recognize objects in an environment. For example, the object recognizers can recognize faces, persons, windows, walls, user input devices, televisions, other objects in the user's environment, etc. One or more object recognizers may be specialized for object with certain characteristics. For example, the object recognizer 708*a* may be used to recognizer faces, while another object recognizer may be used recognize totems.

The object recognitions may be performed using a variety of computer vision techniques. For example, the wearable system can analyze the images acquired by the outward-facing imaging system 464 (shown in FIG. 4) to perform scene reconstruction, event detection, video tracking, object recognition, object pose estimation, learning, indexing, motion estimation, or image restoration, etc. One or more computer vision algorithms may be used to perform these tasks. Non-limiting examples of computer vision algorithms include: Scale-invariant feature transform (SIFT), speeded up robust features (SURF), oriented FAST and rotated BRIEF (ORB), binary robust invariant scalable keypoints (BRISK), fast retina keypoint (FREAK), Viola-Jones algorithm, Eigenfaces approach, Lucas-Kanade algorithm, Horn-Schunk algorithm, Mean-shift algorithm, visual simultaneous location and mapping (vSLAM) techniques, a sequential Bayesian estimator (e.g., Kalman filter, extended Kalman filter, etc.), bundle adjustment, Adaptive thresholding (and other thresholding techniques), Iterative Closest Point (ICP), Semi Global Matching (SGM), Semi Global Block Matching (SGBM), Feature Point Histograms, various machine learning algorithms (such as e.g., support vector machine, k-nearest neighbors algorithm, Naive Bayes, neural network (including convolutional or deep neural networks), or other supervised/unsupervised models, etc.), and so forth.

The object recognitions can additionally or alternatively be performed by a variety of machine learning algorithms. Once trained, the machine learning algorithm can be stored by the HMD. Some examples of machine learning algorithms can include supervised or non-supervised machine learning algorithms, including regression algorithms (such as, for example, Ordinary Least Squares Regression), instance-based algorithms (such as, for example, Learning Vector Quantization), decision tree algorithms (such as, for example, classification and regression trees), Bayesian algorithms (such as, for example, Naive Bayes), clustering algorithms (such as, for example, k-means clustering), association rule learning algorithms (such as, for example, a-priori algorithms), artificial neural network algorithms (such as, for example, Perceptron), deep learning algorithms (such as, for example, Deep Boltzmann Machine, or deep neural network), dimensionality reduction algorithms (such as, for example, Principal Component Analysis), ensemble algorithms (such as, for example, Stacked Generalization), and/or other machine learning algorithms. In some embodiments, individual models can be customized for individual data sets. For example, the wearable device can generate or store a base model. The base model may be used as a starting point to generate additional models specific to a data type (e.g., a particular user in the telepresence session), a data set (e.g., a set of additional images obtained of the user in the telepresence session), conditional situations, or other variations. In some embodiments, the wearable HMD can be configured to utilize a plurality of techniques to generate models for analysis of the aggregated data. Other techniques may include using pre-defined thresholds or data values.

Based on this information and collection of points in the map database, the object recognizers 708a to 708n may recognize objects and supplement objects with semantic information to give life to the objects. For example, if the object recognizer recognizes a set of points to be a door, the system may attach some semantic information (e.g., the door has a hinge and has a 90 degree movement about the hinge). If the object recognizer recognizes a set of points to be a mirror, the system may attach semantic information that the mirror has a reflective surface that can reflect images of objects in the room. Over time the map database grows as the system (which may reside locally or may be accessible through a wireless network) accumulates more data from the world. Once the objects are recognized, the information may be transmitted to one or more wearable systems. For example, the MR environment 700 may include information about a scene happening in California. The environment 700 may be transmitted to one or more users in New York. Based on data received from an FOV camera and other inputs, the object recognizers and other software components can map the points collected from the various images, recognize objects etc., such that the scene may be accurately "passed over" to a second user, who may be in a different part of the world. The environment 700 may also use a topological map for localization purposes.

Figure 8:
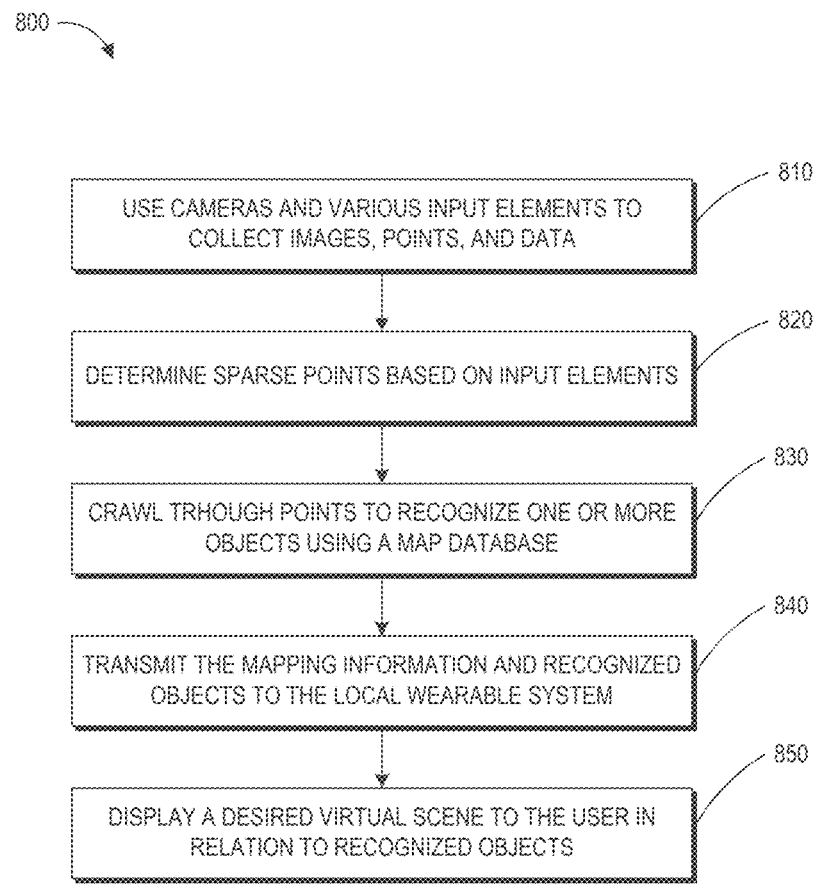
FIG. 8 is a process flow diagram of an example of a method of rendering virtual content in relation to recognized objects.

FIG. 8 is a process flow diagram of an example of a method 800 of rendering virtual content in relation to recognized objects. The method 800 describes how a virtual scene may be represented to a user of the wearable system. The user may be geographically remote from the scene. For example, the user may be New York, but may want to view a scene that is presently going on in California, or may want to go on a walk with a friend who resides in California.

At block 810, the wearable system may receive input from the user and other users regarding the environment of the user. This may be achieved through various input devices, and knowledge already possessed in the map database. The user's FOV camera, sensors, GPS, eye tracking, etc., convey information to the system at block 810. The system may determine sparse points based on this information at block 820. The sparse points may be used in determining pose data (e.g., head pose, eye pose, body pose, or hand gestures) that can be used in displaying and understanding the orientation and position of various objects in the user's surroundings. The object recognizers 708a-708n may crawl through these collected points and recognize one or more objects using a map database at block 830. This information may then be conveyed to the user's individual wearable system at block 840, and the desired virtual scene may be accordingly displayed to the user at block 850. For example, the desired virtual scene (e.g., user in CA) may be displayed at the appropriate orientation, position, etc., in relation to the various objects and other surroundings of the user in New York.

Figure 9:
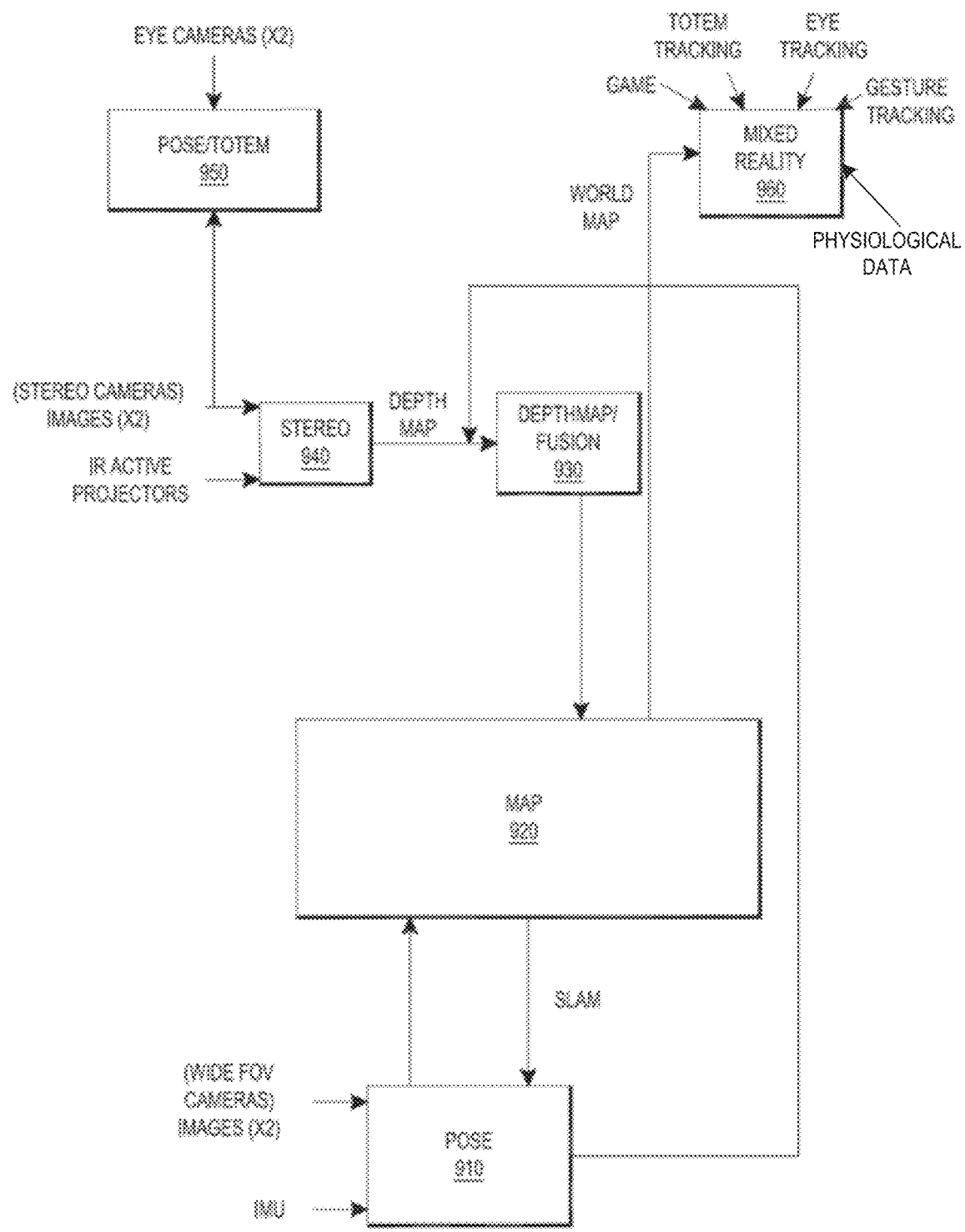
FIG. 9 is a block diagram of another example of a wearable system.

FIG. 9 is a block diagram of another example of a wearable system. In this example, the wearable system 900 comprises a map, which may include map data for the world. The map may partly reside locally on the wearable system, and may partly reside at networked storage locations accessible by wired or wireless network (e.g., in a cloud system). A pose process 910 may be executed on the wearable computing architecture (e.g., processing module 260 or controller 460) and utilize data from the map to determine position and orientation of the wearable computing hardware or user. Pose data may be computed from data collected on the fly as the user is experiencing the system and operating in the world. The data may comprise images, data from sensors (such as inertial measurement units, which generally comprise accelerometer and gyroscope components) and surface information pertinent to objects in the real or virtual environment.

A sparse point representation may be the output of a simultaneous localization and mapping (SLAM or V-SLAM, referring to a configuration wherein the input is images/visual only) process. The system can be configured to not only find out where in the world the various components are, but what the world is made of. Pose may be a building block that achieves many goals, including populating the map and using the data from the map.

In one embodiment, a sparse point position may not be completely adequate on its own, and further information may be needed to produce a multifocal AR, VR, or MR experience. Dense representations, generally referring to depth map information, may be utilized to fill this gap at least in part. Such information may be computed from a process referred to as Stereo 940, wherein depth information is determined using a technique such as triangulation or time-of-flight sensing. Image information and active patterns (such as infrared patterns created using active projectors) may serve as input to the Stereo process 940. A significant amount of depth map information may be fused together, and some of this may be summarized with a surface representation. For example, mathematically definable surfaces may be efficient (e.g., relative to a large point cloud) and digestible inputs to other processing devices like game engines. Thus, the output of the stereo process (e.g., a depth map) 940 may be combined in the fusion process 930. Pose may be an input to this fusion process 930 as well, and the output of fusion 930 becomes an input to populating the map process 920. Sub-surfaces may connect with each other, such as in topographical mapping, to form larger surfaces, and the map becomes a large hybrid of points and surfaces.

To resolve various aspects in a mixed reality process 960, various inputs may be utilized. For example, in the embodiment depicted in FIG. 9, Game parameters may be inputs to determine that the user of the system is playing a monster battling game with one or more monsters at various locations, monsters dying or running away under various conditions (such as if the user shoots the monster), walls or other objects at various locations, and the like. The world map may include information regarding where such objects are relative to each other, to be another valuable input to mixed reality. Pose relative to the world becomes an input as well and plays a key role to almost any interactive system.

Controls or inputs from the user are another input to the wearable system 900. As described herein, user inputs can include visual input, gestures, totems, audio input, sensory input (such as e.g., physiological data acquired by sensors 232 in FIG. 2), etc. In order to move around or play a game, for example, the user may need to instruct the wearable system 900 regarding what he or she wants to do. Beyond just moving oneself in space, there are various forms of user controls that may be utilized. In one embodiment, a totem (e.g. a user input device), or an object such as a toy gun may be held by the user and tracked by the system. The system preferably will be configured to know that the user is holding the item and understand what kind of interaction the user is having with the item (e.g., if the totem or object is a gun, the system may be configured to understand location and orientation, as well as whether the user is clicking a trigger or other sensed button or element which may be equipped with a sensor, such as an IMU, which may assist in determining what is going on, even when such activity is not within the field of view of any of the cameras.)

Hand gesture tracking or recognition may also provide input information. The wearable system 900 may be configured to track and interpret hand gestures for button presses, for gesturing left or right, stop, grab, hold, etc. For example, in one configuration, the user may want to flip through emails or a calendar in a non-gaming environment, or do a "fist bump" with another person or player. The wearable system 900 may be configured to leverage a minimum amount of hand gesture, which may or may not be dynamic. For example, the gestures may be simple static gestures like open hand for stop, thumbs up for ok, thumbs down for not ok; or a hand flip right, or left, or up/down for directional commands.

Eye tracking is another input (e.g., tracking where the user is looking to control the display technology to render at a specific depth or range). In one embodiment, vergence of the eyes may be determined using triangulation, and then using a vergence/accommodation model developed for that particular person, accommodation may be determined.

The totem can also be used by a user to provide input to the wearable system. The wearable system can track the movement, position, or orientation of the totem, as well as a user's actuation of the totem (such as pressing keys, buttons, or a touch surface of the totem) to determine a user interface interaction in the mixed reality process 960.

In certain implementations, the wearable system can also use physiological data of a user in the mixed reality process 960. The physiological data may be required by the sensors 232 (which may include physiological sensors 468). The wearable system can determine which content to present based on the analysis of the physiological data. For example, when the wearable system determines that the user is angry (e.g., due to increased heart rate, change in blood pressure, etc.) while a user is playing a game, the wearable system can automatically reduce the level of game difficulty to keep the user engaged in the game.

With regard to the camera systems, the example wearable system 900 shown in FIG. 9 can include three pairs of cameras: a relative wide FOV or passive SLAM pair of cameras arranged to the sides of the user's face, a different pair of cameras oriented in front of the user to handle the stereo imaging process 940 and also to capture hand gestures and totem/object tracking in front of the user's face. The FOV cameras and the pair of cameras for the stereo process 940 may be a part of the outward-facing imaging system 464 (shown in FIG. 4). The wearable system 900 can include eye tracking cameras (which may be a part of an inward-facing imaging system 462 shown in FIG. 4) oriented toward the eyes of the user in order to triangulate eye vectors and other information. The wearable system 900 may also comprise one or more textured light projectors (such as infrared (IR) projectors) to inject texture into a scene.

Figure 10:
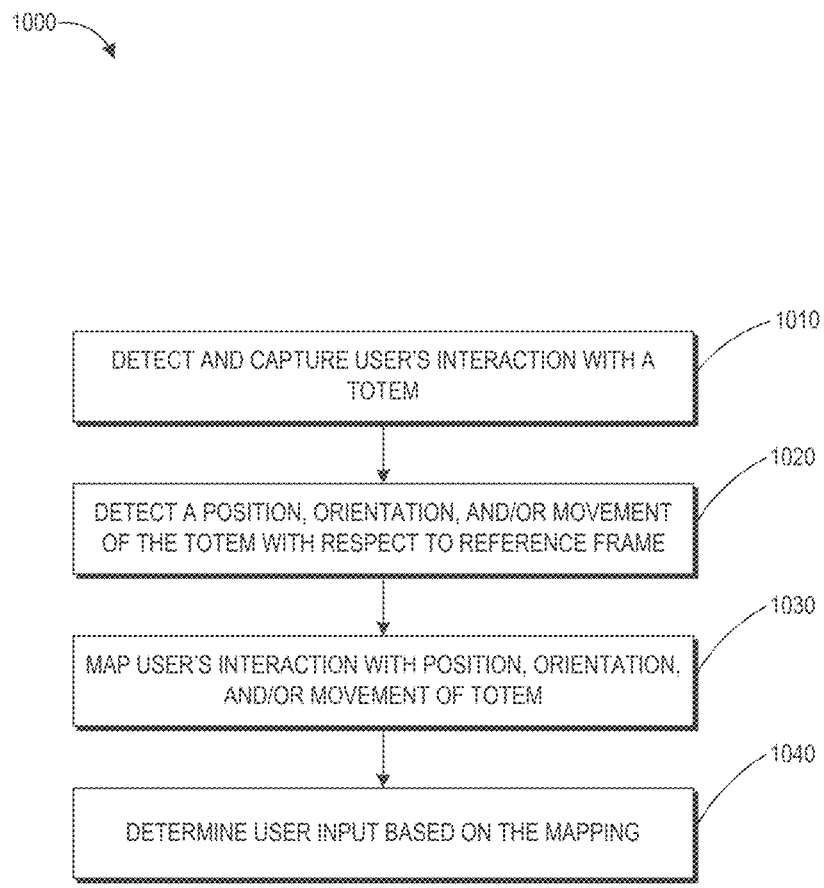
FIG. 10 is a process flow diagram of an example of a method for determining user input to a wearable system.

FIG. 10 is a process flow diagram of an example of a method 1000 for determining user input to a wearable system. In this example, the user may interact with a totem. The user may have multiple totems. For example, the user may have designated one totem for a social media application, another totem for playing games, etc. At block 1010, the wearable system may detect a motion of a totem. The movement of the totem may be recognized through the outward facing system or may be detected through sensors (e.g., haptic glove, image sensors, hand tracking devices, eye-tracking cameras, head pose sensors, etc.).

Based at least partly on the detected gesture, eye pose, head pose, or input through the totem, the wearable system detects a position, orientation, and/or movement of the totem (or the user's eyes or head or gestures) with respect to a reference frame, at block 1020. The reference frame may be a set of map points based on which the wearable system translates the movement of the totem (or the user) to an action or command. At block 1030, the user's interaction with the totem is mapped. Based on the mapping of the user interaction with respect to the reference frame 1020, the system determines the user input at block 1040.

For example, the user may move a totem or physical object back and forth to signify turning a virtual page and moving on to a next page or moving from one user interface (UI) display screen to another UI screen. As another example, the user may move their head or eyes to look at different real or virtual objects in the user's FOR. If the user's gaze at a particular real or virtual object is longer than a threshold time, the real or virtual object may be selected as the user input. In some implementations, the vergence of the user's eyes can be tracked and an accommodation/vergence model can be used to determine the accommodation state of the user's eyes, which provides information on a depth plane on which the user is focusing. In some implementations, the wearable system can use ray casting techniques to determine which real or virtual objects are along the direction of the user's head pose or eye pose. In various implementations, the ray casting techniques can include casting thin, pencil rays with substantially little transverse width or casting rays with substantial transverse width (e.g., virtual cones or frustums).

The user interface may be projected by the display system as described herein (such as the display 220 in FIG. 2). It may also be displayed using a variety of other techniques such as one or more projectors. The projectors may project images onto a physical object such as a canvas or a globe. Interactions with user interface may be tracked using one or more cameras external to the system or part of the system (such as, e.g., using the inward-facing imaging system 462 or the outward-facing imaging system 464).

Figure 11:
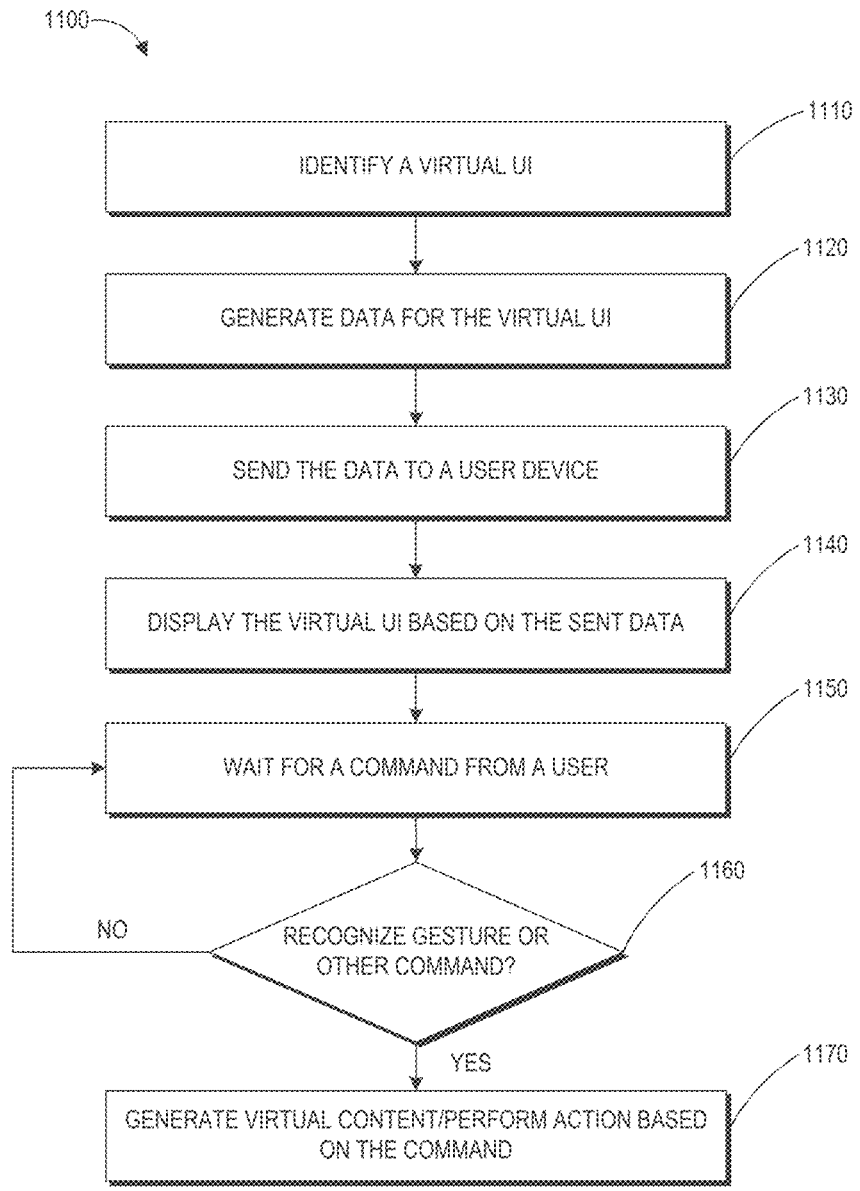
FIG. 11 is a process flow diagram of an example of a method for interacting with a virtual user interface.

FIG. 11 is a process flow diagram of an example of a method 1100 for interacting with a virtual user interface. The method 1100 may be performed by the wearable system described herein.

At block 1110, the wearable system may identify a particular UI. The type of UI may be predetermined by the user. The wearable system may identify that a particular UI needs to be populated based on a user input (e.g., gesture, visual data, audio data, sensory data, direct command, etc.). At block 1120, the wearable system may generate data for the virtual UI. For example, data associated with the confines, general structure, shape of the UI etc., may be generated. In addition, the wearable system may determine map coordinates of the user's physical location so that the wearable system can display the UI in relation to the user's physical location. For example, if the UI is body centric, the wearable system may determine the coordinates of the user's physical stance, head pose, or eye pose such that a ring UI can be displayed around the user or a planar UI can be displayed on a wall or in front of the user. If the UI is hand centric, the map coordinates of the user's hands may be determined. These map points may be derived through data received through the FOV cameras, sensory input, or any other type of collected data.

At block 1130, the wearable system may send the data to the display from the cloud or the data may be sent from a local database to the display components. At block 1140, the UI is displayed to the user based on the sent data. For example, a light field display can project the virtual UI into one or both of the user's eyes. Once the virtual UI has been created, the wearable system may simply wait for a command from the user to generate more virtual content on the virtual UI at block 1150. For example, the UI may be a body centric ring around the user's body. The wearable system may then wait for the command (a gesture, a head or eye movement, input from a user input device, etc.), and if it is recognized (block 1160), virtual content associated with the command may be displayed to the user (block 1170). As an example, the wearable system may wait for user's hand gestures before mixing multiple steam tracks.

Additional examples of wearable systems, UIs, and user experiences (UX) are described in U.S. Patent Publication No. 2015/0016777, which is incorporated by reference herein in its entirety.

Example Objects in an Environment

Figure 12:
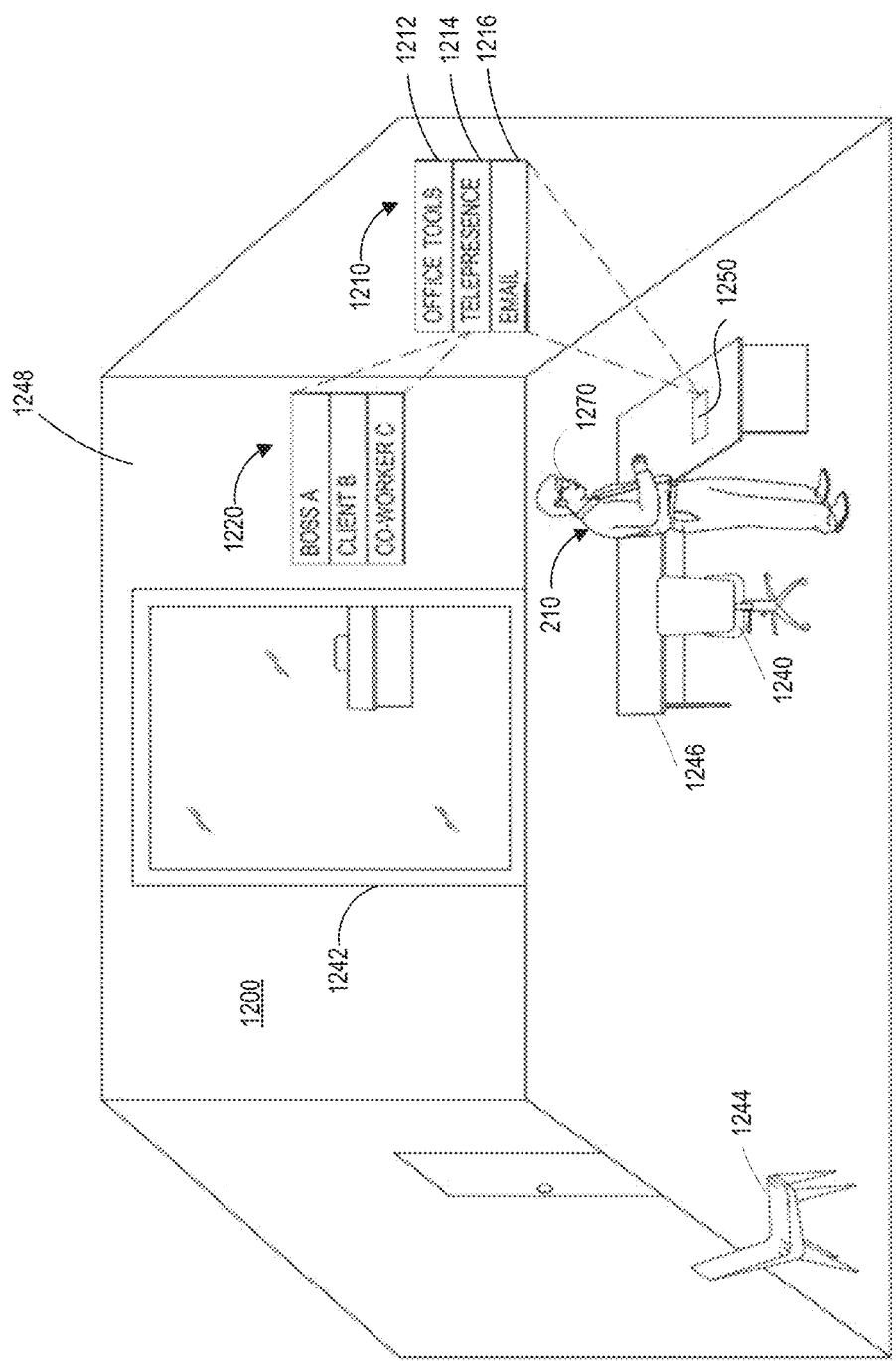
FIG. 12 illustrates an example of a user interacting with a virtual user interface in an office environment.

FIG. 12 illustrates an example of a user interacting with a virtual user interface in an office environment. In FIG. 12, the user 210 wearing a wearable device 1270 is standing in an office 1200. The wearable device may be part of the wearable system 200, 400 as described herein. The office 1200 can comprise a plurality of physical objects such as a chair 1244 a mirror 1242, a wall 1248, a table 1246, a rolling chair 1240, and a virtual screen 1250 that is presented to the user by the wearable device 1270.

Example Objects in the Field of Regard

The user 210 wearing the wearable device 1270 can have a field of view (FOV) and a field of regard (FOR). As discussed with reference to FIG. 4, the FOR comprises a portion of the environment around the user that is capable of being perceived by the user via the wearable device 1270. For an HMD, the FOR may include substantially all of the 4π steradian solid angle surrounding the wearer, because the wearer can move her body, head, or eyes to perceive substantially any direction in space. In other contexts, the user's movements may be more constricted, and accordingly the user's FOR may subtend a smaller solid angle.

The FOR can contain a group of objects which can be perceived by the user via the ARD. The objects may be virtual and/or physical objects. The virtual objects may include operating system objects such as e.g., a recycle bin for deleted files, a terminal for inputting commands, a file manager for accessing files or directories, an icon, a menu, an application for audio or video streaming, a notification from an operating system, and so on. The virtual objects may also include objects in an application such as e.g., avatars, widgets (e.g., a virtual representation of a clock), virtual objects in games, graphics or images, etc. Some virtual objects can be both an operating system object and an object in an application.

In some embodiments, virtual objects may be associated with physical objects. For example, as shown in FIG. 12, a virtual screen 1250 may be placed on the table 1246. The virtual screen may include a virtual menu 1210 which has selectable options such as an office productivity tool 1212, an application for conducting telepresence 1214, and an email tool 1216.

A virtual object may be a three-dimensional (3D), two-dimensional (2D), or one-dimensional (1D) object. The virtual object may be a 3D coffee mug (which may represent a virtual control for a physical coffee maker). The virtual object may also be a 2D menu 1210 (shown in FIG. 12). In some implementations, one or more virtual objects may be displayed within (or associated with) another virtual object. For example, with reference to FIG. 12, the virtual menu 5110 is shown inside of the virtual screen 1250. In another example, the virtual application for telepresence 1214 may include another menu 1220 with contact information.

In some implementations, some objects in the user's environment may be interactable. For example, with reference to FIG. 1, the user can interact with some of the virtual objects such as, e.g., by holding out a finger for the avatar 140 to land on or pulling up a menu that provides information about the statue 130. The user can interact with the interactable objects by performing user interface operations such as, e.g., selecting or moving the interactable objects, actuating menus associated with the interactable objects, selecting operations to be performed using the interactable object, etc. The user may perform these user interface operations using head pose, eye pose, body pose, voice, hand gestures on a user input device, alone or in combination. For example, the user may move a virtual object from one location to another with changes in body pose (e.g., changes in hand gestures such as waving his hand at the virtual object). In another example, as shown in FIG. 12, a user can use hand gestures to actuate a user input device to open the virtual screen 1250 when the user stands near the table 1246. The user may actuate the user input device 466 by clicking on a mouse, tapping on a touch pad, swiping on a touch screen, hovering over or touching a capacitive button, pressing a key on a keyboard or a game controller (e.g., a 5-way d-pad), pointing a joystick, wand, or totem toward the object, pressing a button on a remote control, or other interactions with a user input device, etc. In certain implementation, the wearable device 1270 can automatically present the virtual menu 1210 upon detection of the table 1246 (e.g., using one or more object recognizers 708). After the menu is opened, the user can browse the menu 1210 by moving his figures along a trajectory on the user input device. When the user decides to close the virtual screen 1250, the user may say a word (e.g., saying "exit") and/or actuate the user input device indicating the intent to close the virtual screen 1250. After receiving the indication, the ARD can stop projecting the screen 1250 on the table 1246.

Example Objects in the Field of View

Within the FOR, the portion of the world that a user perceives at a given time is referred to as the FOV (e.g., the FOV may encompass the portion of the FOR that the user is currently looking toward). The FOV can depend on the size or optical characteristics of the display in the ARD. For example, the AR display may include optics that only provide AR functionality when the user looks through a particular portion of the display. The FOV may correspond to the solid angle that is perceivable by the user when looking through an AR display such as, e.g., the stacked waveguide assembly 480 (FIG. 4) or the planar waveguide 632*b* (FIG. 6).

As the user's pose changes, the FOV will correspondingly change, and the objects within the FOV may also change.

With reference to FIG. 12, the user 210 can perceive the virtual screen 1250 when he is standing in front of the table 1246. When the user 210 walks to the mirror 1242, however, the virtual screen 1250 may move outside of his FOV. Accordingly the user 210 will not be able to perceive the virtual screen 1250 when he stands in front of the mirror 1242. In some embodiments, the virtual screen 1250 may follow the user 210 as he moves around in the office 1200. For example, the virtual screen 1250 may move from the table 1246 to the wall 1248 when the user 210 moves to stand in front of the mirror 1242. The content of the virtual screen, such as the options on the virtual menu 1210 may change when the virtual screen 1250 changes its location. As an example, in FIG. 12, when the virtual screen 1250 is on the table 1250, the user 210 can perceive the virtual menu 1210 which includes a variety of office productivity items. However, when the user walks to the mirror 1242, the user may be able to interact with a virtual wardrobe application which allows the user to simulate the look of different outfits using the wearable device 1270. In certain implementations, once the wearable device 1270 detects the mirror 1242, the wearable system can automatically initiate a communication (e.g., a telepresence session) with another user (e.g., with the user's 210 personal assistant).

Examples of Rendering Virtual Objects in the FOV Based on Contextual Factors

As described herein, there are often multiple virtual objects or user interaction options associated with an object (e.g. physical or virtual) or a user's environment. For example, with reference to FIG. 12, the virtual menu 1210 includes multiple interaction options such as office productivity tools 1212 (such as word processors, file folders, calendar, etc.), a telepresence application 1214 which allows a user to communicate (via the wearable system) with another user as if the other user is present in the user's 210 environment (e.g., the wearable system can project an image of the other user to the user of the wearable system), and a mail tool which allows the user 210 to send and receive an electronic mail (email) or a text message. In another example, the living room 1300 shown in FIGS. 13 and 14 may include virtual objects such as a digital frame 1312a, a telepresence tool 1314a, racecar driving games 1316a, a television (TV) application 1312b, a home management tool 1314b (which can manage the temperature, project wall papers, etc., for the room 1300) and a music application 1316b.

Figure 13:
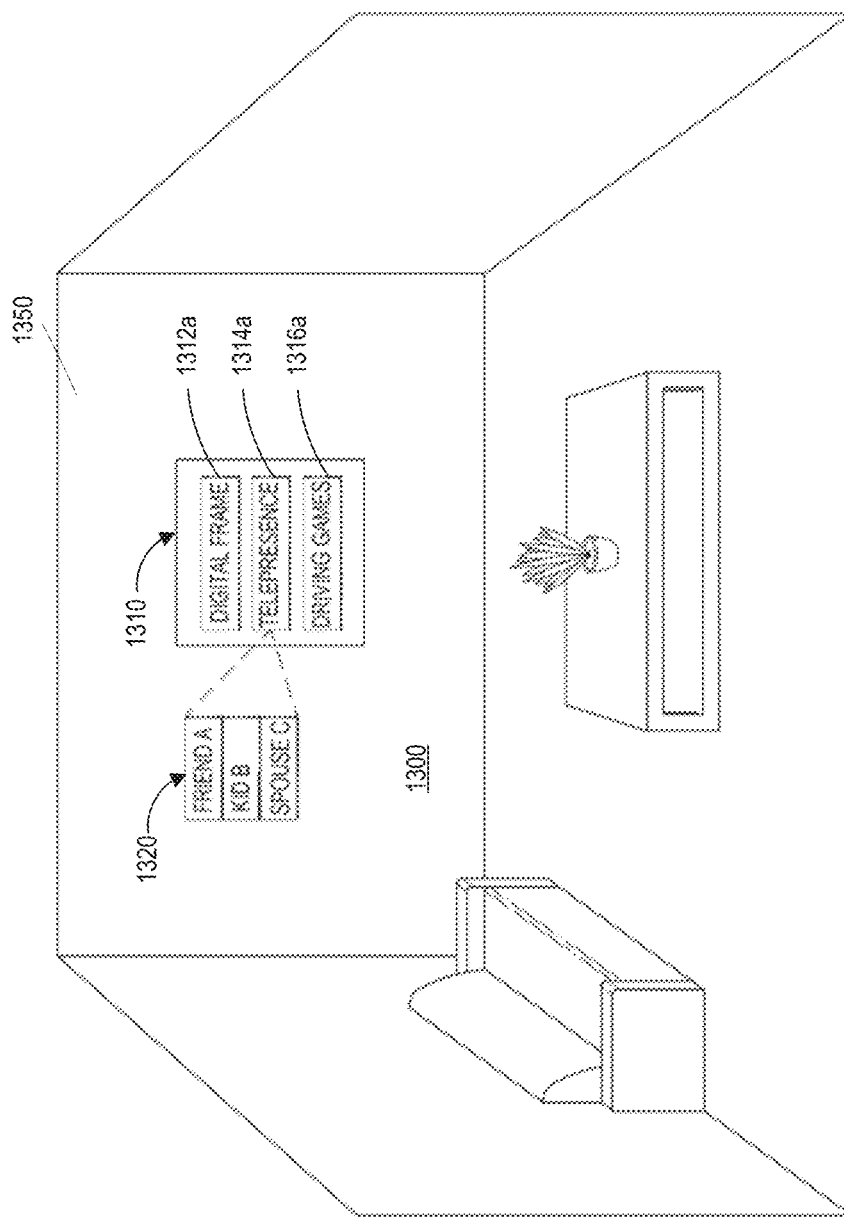
FIGS. 13 and 14 illustrate examples of a user interacting with a virtual user interface in a living room environment.
Figure 14:
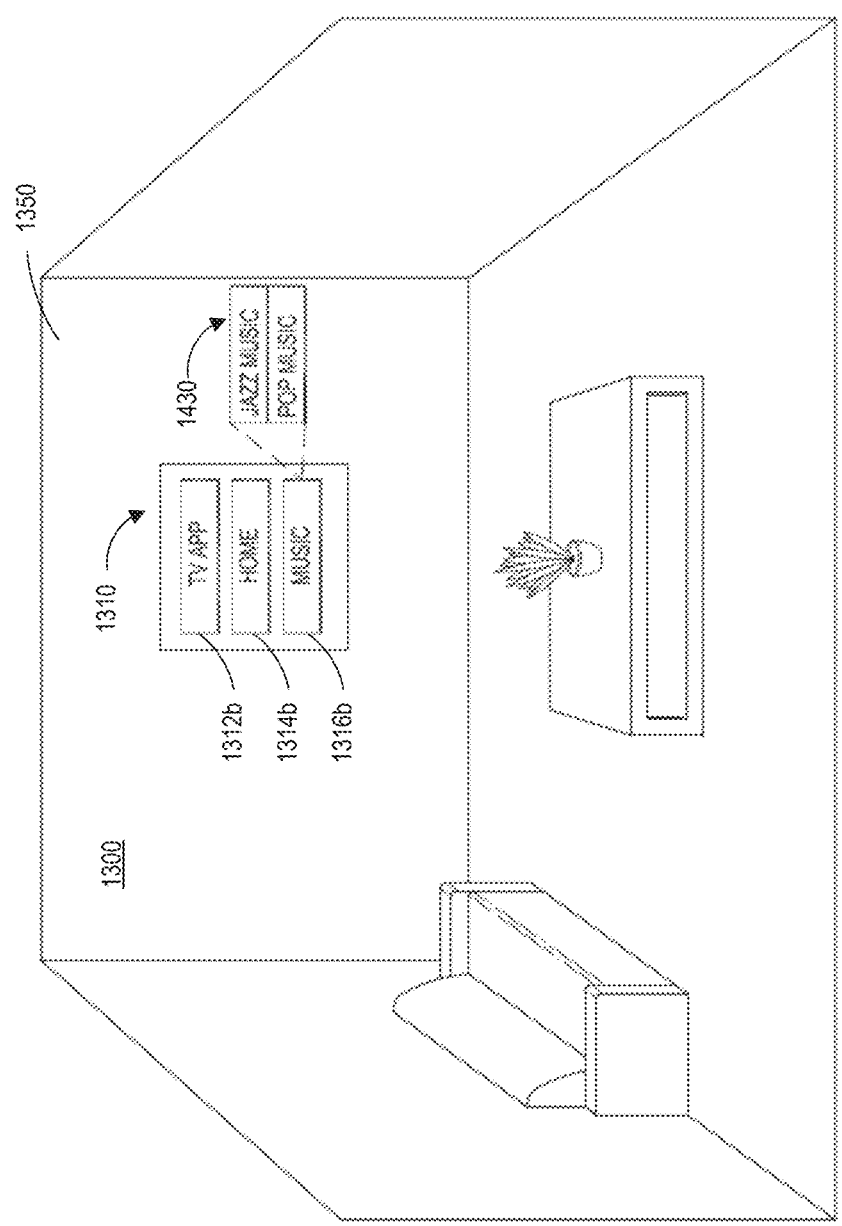

However, as described herein, the virtual user interface may not be able to display all available virtual objects or user interaction options to the user and provide satisfactory user experience at the same time. For example, as shown in FIGS. 13 and 14, there are six virtual objects (1312a, 1314a, 1316a, 1312b, 1314b, and 1316b) associated with the user interface 1310 which may be a virtual menu. But the virtual menu on the wall 1350 can only legibly fit three options (see e.g. the virtual menus in FIGS. 13 and 14). As a result, the wearable system may need to filter the number of options available and only display a subset of the available options.

Advantageously, in some embodiments, the wearable system can filter or select the user interaction options or virtual objects to be presented on the user interface 1310 based on contextual information. The filtered or selected user interface interaction options or virtual objects may be presented in various layouts. For example, the wearable device can present the options and the virtual objects in a list form (such as the virtual menus shown in FIGS. 12-14). In certain embodiments, rather than displaying as a vertical listing of virtual objects on a virtual user interface, the virtual menu can employ a circular representation of the virtual objects (see e.g., the virtual menu 1530 shown in FIG. 15). The virtual objects can be rotated about the center of the circular representation to assist in identifying and selecting a desired virtual object. The contextual information can include information associated with the user's environment, the user, objects in the user's environment, etc. Example contextual information can include the affordance of a physical object with which the options are associated, the user's environment (such as whether the environment is a home or an office environment), the user's characteristics, the user's current interactions with objects in the environment, the user's physiological state, the user's psychological state, in combination or the like. More detailed descriptions of various types of contextual information are provided below.

The Environment of the User

The wearable system may filter or select virtual objects in the environment and present only a subset of virtual objects for user interactions based on the environment of the user. This is because different environments may have different functionalities. For example, a user's contact list may include contact information for family members, friends, and professional contacts. In an office environment, such as the office 1200 shown in FIG. 12, it is usually more suitable for work related activities instead of entertainment activities. As a result, when the user 210 uses the telepresence tool 1214, the wearable device 1270 may present a list of work related contacts in the menu 1220 for a telepresence session even though the user's contact list also includes contacts for family and friends. In contrast, FIG. 13 depicts a living room 1300 where the user usually relaxes and interacts with people outside of work. As a result, when the user selects the telepresence tool 1314a, the wearable device may show contact information for friends and family members in the menu 1320.

As another example, a user's music collection may include a variety of music such as country music, jazz, pop, and classical music. When a user is in the living room 1300, the wearable device can present Jazz and pop music to the user (as shown in the virtual menu 1430). However, when the user is in the bedroom 1500, a different set of music options may be presented. For example, as shown in the virtual menu 1530 in FIG. 15, the wearable device may show country music and classical music because these types of music may have a relaxing effect and may help with the user to fall asleep.

In addition or alternative to filtering available virtual objects in the environment, the wearable device may show only menu options relevant to the functions of the environment. For example, the virtual menu 1210 (in FIG. 12) in the office 1200 can include options pertinent to work environment. On the other hand, the virtual user interface 1310 (in FIG. 14) in the living room 1300 can include entertainment items such as virtual TV 1312b, music 1316b, as well as home management tools 1314b.

The example environments described with reference to FIGS. 12-15 are intended to be illustrative and not to limit the type of environments in which the wearable device can be used to interact contextually with physical and virtual content in such environments. Other environments can include other portions of a home or office, a vehicle (e.g., car, subway, boat, train, or airplane), an entertainment venue (e.g., movie theater, night club, gaming facility), a retail facility (e.g., a store or a mall), or the outdoors (e.g., a park or yard), etc.

Affordance of an Object

The wearable system can identify an object in the environment which the user might be interested in or is currently interacting with. The wearable system can identify the object based on the user's pose, such as e.g., eye gaze, body pose, or head pose. For example, the wearable device may use the inward-facing imaging system 462 (shown in FIG. 4) to track the user's eye pose. When the wearable system determines that the user is looking at a direction for an extended period of time, the wearable system may use a raycasting or conecasting technique to identify an object which intersects with the user's direction of gaze. For example, wearable system can cast a virtual cone/ray and identify the object that intersects a portion of the virtual cone/ray. The wearable device may also use IMUs (e.g., described with reference to FIGS. 2, 4, and 9) to track the user's head pose. When the wearable device detects a change in the user's head pose, the wearable device may identify an object near the user's head as the object the user is interested in interacting with. As an example, when the user of the wearable device is looking at a refrigerator at home for an extended period of time, the wearable device can recognize the refrigerator may be the object the user is interested in. In another example, the user may be standing in front of a refrigerator. The wearable may detect a nod by the user and identify the refrigerator in front of the user as the object that the user is interested in. In yet another example, the object recognizers 708 can track the user's hand movements (e.g., based on data from the outward-facing imaging system 464). The object recognizers can recognize a hand gesture (e.g., a finger pointing at the refrigerator) which provides an indication of the object for user interaction.

The wearable system can recognize affordances of the identified object. The affordance of the object comprises a relation between the object and the environment of the object which affords an opportunity for an action or use associated with the object. The affordances may be determined based on, for example, the function, the orientation, the type, the location, the shape, and/or the size of the object. The affordances may also be based on the environment in which the physical object is located. The wearable device can narrow down available virtual objects in the environment and present virtual objects according to the affordances of the object. As examples, an affordance of a horizontal table is that objects can be set onto the table, and an affordance of a vertical wall is that objects may be hung from or projected onto the wall.

For example, wearable device may identify functions of an object and show a menu having only objects relevant to the functions of the object. As an example, when a user of the wearable device is interacting with a refrigerator at home, the wearable device can identify that one of the refrigerator's functionalities is storing food. The ability to store food is an affordance of the refrigerator. When the user decides to view options associated with the refrigerator, for example, by actuating the user input device, the wearable device can present to the user options specific to food such as showing a list of food currently available in the refrigerator, a cooking application which includes various recipes, a grocery list of food items, a reminder to change a water filter in the refrigerator, etc. Additional examples of affordances of a refrigerator include that it is heavy and therefore difficult to move, it has a vertical front surface upon which things can be posted, that the front surface is often metallic and magnetic so that magnetic objects can stick to the front surface, and so forth.

In some situations, functions of the same object may vary based on the environment. The wearable system can generate a virtual menu by considering the functionalities of the object in light of the environment. For example, affordances of a table include that it may be used for writing and dining. When a table is in the office 1200 (shown in FIG. 12), the affordance of the table may suggest that the table should be used for writing because office environment is usually associated with document processing. Accordingly, the display 220 of the wearable device may present a virtual menu 1210 with a word processing application under the office tools 1212 or an email application 1216. When the same table is located in a kitchen, however, the affordance of the table may suggest that the table may be used for dining because people usually do not write documents in their kitchen. As a result, the wearable device may display to the user virtual objects related to food instead of office tools.

The wearable system can use the orientation of the object to determine which options should be presented because some activities (such as drawing pictures and writing documents) may be more appropriate on a horizontal surface (such as a floor or a table), while other activities (such as watching TV or playing driving games) may have a better user experience on a vertical surface (such as a wall). The wearable system can detect the orientation of the surface of the object (e.g., horizontal vs. vertical) and display a group of options appropriate for that orientation.

With reference to FIG. 12, the office 1200 may include virtual objects such as office tools 1212 for document processing and a virtual TV application (not shown in FIG. 12). Because the virtual screen 1250 is on the table 1246 which has a horizontal surface, the wearable device 1270 may present a menu 1210 with office tools 1212 because document processing is more appropriately done on a horizontal surface. Meanwhile, the wearable device 12700 may be configured not present the virtual TV application because the virtual TV may be more appropriate for a vertical surface and the user is currently interacting with an object having horizontal surface. However, if the user is standing in front of the wall 1248, the wearable device 1270 may include the virtual TV in the menu 1210 while excluding office tools 1212.

As another example, in FIGS. 13 and 14, the virtual user interface 1310 is on the wall 1350 which has a vertical surface. As a result, the user interface 1310 can include driving games 1316*a* as shown in FIG. 13 and include a virtual TV application 1316*b* as shown in FIG. 14. This is because the user may have a better experience when performing these activities on a vertical surface.

In addition or in alternative to the function, the orientation, the location of the object, and the affordance may also be determined based on the type of the object. For example, a sofa may be associated with entertainment activities such as watching a TV while a desk chair may be associated with work related activities such as creating financial reports. The wearable system can also determine the affordances based on the size of the object. For example, a small table may be used for holding decorations such as a vase while a big table may be used for family dining. As another example, the affordances may also be based on the shape of the object. A table with circular top may be associated with certain group games such as poker while a table with a rectangular top may be associated with single player games such as Tetris.

User's Characteristics

Figure 15:
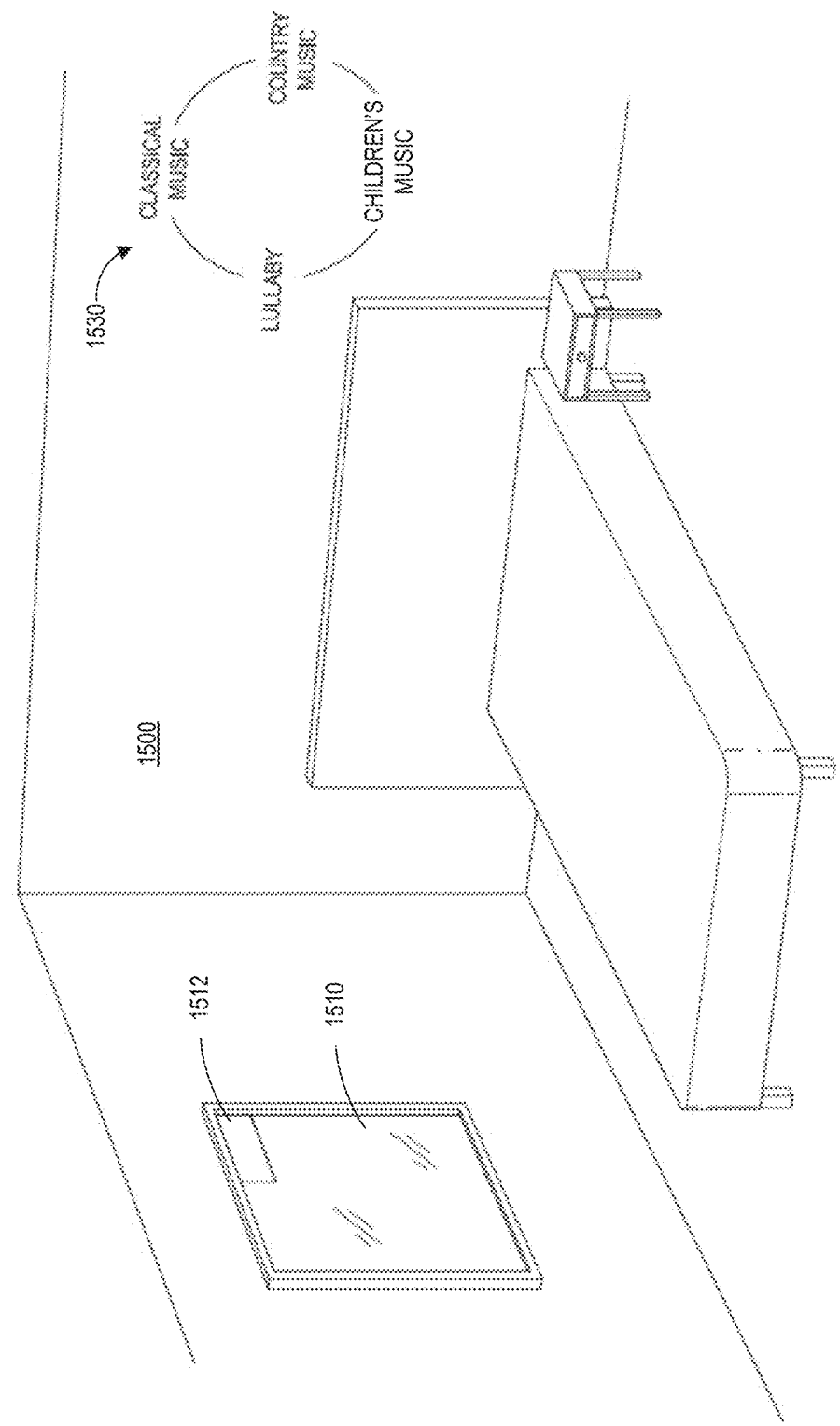
FIG. 15 illustrates an example of a user interacting with a virtual user interface in a bedroom environment.

The wearable system may also present options based on the user's characteristics such as age, gender, educational level, occupation, preference, etc. The wearable system may identify these characteristics based on the profile information provided by the user. In some embodiments, the wearable system may deduce these characteristics based on the user's interactions (such as, e.g., frequently viewed content) with the wearable system. Based on the user's characteristics, the wearable system can present contents that match the user's characteristics. For example, as shown in FIG. 15, if the user of the wearable device is a young child, the wearable device may provide the options for children's music and lullaby in the menu 1530 in the bedroom 1500.

In some implementations, an environment may be shared by multiple people. The wearable system may analyze the characteristics of the people sharing the space and only present content that is suitable for the people sharing the space. For example, the living room 1300 may be shared by all family members. If the family has a young child, the wearable device may only present movies that have a rating such that the movie is suitable for children without an adult present (e.g., a "G"-rated movie). In some embodiments, the wearable system may be able to identify people in the same environment as the wearable system images the environment and present options based on who is present in the environment. For example, the wearable system may use the outward-facing imaging system to acquire images of the environment and the wearable system can analyze those images to identify one or more people present in the image using facial recognition techniques. If the wearable system determines that a child who is wearing an HMD and is sitting in the same living room with his parent, the wearable system may present movies rated as suitable to the child in the presence of an adult (e.g., a "PG"-rated movie) in addition or in alternative to G-rated movies.

The wearable system may present a virtual menu based on the user's preference. The wearable system may deduce the user's preference based on previous usage patterns. The previous usage patterns may include information on the location and/or information on the time for which a virtual object is used. For example, every morning when the user 210 brings up the virtual screen 1250 in his office 1200 (shown in FIG. 12), the user 210 typically first checks his email. Based on this usage pattern, the wearable system may display the email application 1216 in the menu 1210. In another example, every morning when the user 210 walks into the living room 1300, the user typically watches the news on the virtual TV screen 1312b (shown in FIG. 14). The wearable system may accordingly show the TV application 1312b on the virtual user interface 1310 based on the user's frequent use. The wearable system, however, will not show the email application 1210 in the virtual user interface 1310 because the user 210 does not usually check his email in his living room 1300. On the other hand, if the user 210 checks his email frequently regardless of his location, the wearable system may show the email application 1216 in the virtual user interface 1310 as well.

The options in a menu may vary according to the time of the day. For example, if the user 210 usually listens to Jazz music or Pop music in the morning and plays driving games at night, the wearable system may present the options for Jazz music and Pop music in the menu 1430 in the morning while present the driving games 1316a at night.

The AR system may also allow the user to input his preference. For example, the user 210 may add his boss's contact information to his contact list 1220 (shown in FIG. 12) even though he may not talk to his boss frequently.

Interactions of the User with Objects in the Environment

The wearable device may present a subset of virtual objects in the user's environment based on current user interactions. The wearable device may present virtual objects based on the persons with whom the user is interacting. For example, when the user is conducting a telepresence session in his living room 1300 with one of his family members, the wearable device may automatically bring up a photo album on the wall because the user may want to talk about a shared experience captured by the photo album. On the other hand, when the user is conducting a telepresence session in his office 1200 with one of his co-workers, the wearable device may automatically present documents that he and his coworker have collaborated on.

The wearable device may also present virtual objects based on the virtual object with which the user is interacting with. For example, if the user is currently preparing a financial document, the wearable device may present data analytics tools such as a calculator. But if the user is currently writing a novel, the wearable device may present the user with word processing tools.

A User's Physiological or Psychological State

Contextual information can include a user's physiological state, psychological state, or autonomic nerve system activity, in combination or the like. As described with reference to FIG. 2, the wearable system can use various sensors 232 to measure the user's reaction to the virtual content or the environment. For example, one or more sensors 232 may obtain data of the user's eye region and use such data to determine the user's mood. The wearable system can use the inward-facing imaging system 462 (shown in FIG. 4) to obtain images of the eyes. The ARD can use the images to determine eye movements, pupil dilation, and heart rate variability. In some implementations, when the inward-facing imaging system 462 has a sufficiently large field of view, the wearable system can use images obtained by the inward-facing imaging system 462 to determine facial expressions of the user. The wearable system can also determine user's facial expression using the outward-facing imaging system 464 (shown in FIG. 2). For example, the outward-facing imaging system 464 can acquire reflected images of the user's face when the user stands near a reflective surface (such as a mirror). The wearable system can analyze the reflected images to determine user's facial expressions. Additionally or alternatively, the wearable system can include sensors which measure electro-dermal activity (such as galvanic skin response). The sensors may be part of the user wearable glove and/or the user input device 466 (described with reference to FIG. 4). The wearable system can use the electro-dermal activity data to determine the user's emotions.

The wearable system can also include sensors for electromyography (EMG), electroencephalogram (EEG), functional near-infrared spectroscopy (fNIR), and so on. The wearable system can use data obtained from these sensors to determine the user's psychological and physiological state. These data may be used alone or in combination with data obtained from other sensors such as the inward-facing imaging system, the outward-facing imaging system, and the sensors for measuring elector-dermal activity. The ARD can use the information of the user's psychological and physiological state to present virtual content (such as a virtual menu) to a user.

As an example, the wearable system can suggest a piece of entertainment content (e.g., a game, a movie, music, scenery to be displayed) based on the user's mood. The entertainment content may be suggested for improving the user's mood. For example, the wearable system may determine that the user is currently under stress based on the user's physiological data (such as sweating). The wearable system can further determine the user is at work based on the information acquired from a location sensor (such as a GPS) or images acquired form the outward-facing imaging system 464. The wearable system can combine these two pieces of information and determine that the user is experiencing stress at work. Accordingly, the wearable system can suggest the user to play a slower-paced exploratory, open-ended game, during the lunch break to calm down, display relaxing scenery on a virtual display, play soothing music in the user's environment, and so forth.

As another example, multiple users may be present together or interact with each other in a physical or virtual space. The wearable system can determine one or more shared moods (such as whether the group is happy or angry) among the users. The shared mood may be a combination or fusion of multiple users' moods, and may target a common mood or theme among the users. The wearable system can present virtual activities (such as games) based on the shared mood among the users.

Fiducial Marker

In some implementations, the contextual information may be encoded in a fiducial marker (also referred to herein as a label). The fiducial marker may be associated with a physical object. The fiducial marker may be an optical marker such as a quick response (QR) code, a bar code, an ArUco marker (which can be reliably detected under occlusion), etc. The fiducial marker may also comprise an electromagnetic marker (e.g., a radio-frequency identification tag) which can emit or receive electromagnetic signals detectable by the wearable device. Such fiducial markers may be physically affixed on or near the physical object. The wearable device can detect the fiducial marker using the outward-facing imaging system 464 (shown in FIG. 4) or one or more sensors that receive signals from or transmit signals to the fiducial marker (e.g., to transmit a signal to the marker, which may then return a reply signal).

When the wearable device detects the fiducial marker, the wearable device can decode the fiducial marker and present a group of virtual objects based on the decoded fiducial marker. In some embodiments, the fiducial marker may contain a reference to a database that includes an association between virtual objects to be displayed and related contextual factors. For example, the fiducial marker can include an identifier of the physical object (such as, e.g., a table). The wearable device can access the contextual characteristics of the physical object using the identifier. In this example, the contextual characteristics of the table can include a size of the table and a horizontal surface. The accessed characteristics can be used to determine which user interface operations or virtual objects are supported by the physical object. Because the table has a horizontal surface, the wearable device can present an office processing tool rather than a painting on the table's surface because the painting is typically associated with a vertical surface rather than a horizontal surface.

For example, in FIG. 15, an ArUco marker 1512 is attached to the window 1510 in the bedroom 1500. The wearable system can identify the ArUco marker 1512 (e.g., based on images acquired by the outward-facing imaging system 464) and extract information encoded in the ArUco marker 1512. In some embodiments, the extracted information may be sufficient for the wearable to render a virtual menu associated with the fiducial marker, without analyzing the other contextual information of the window or the user's environment. For example, the extracted information may include an orientation of the window 1510 (e.g., the window 1510 has a vertical surface). Based on the orientation, the wearable system can present virtual objects that are associated with a vertical surface. In certain implementations, the wearable system may need to communicate with another data source (e.g., the remote data repository 280) to obtain contextual information such as the type of the object (e.g. a mirror), the environment associated with the object, the user's preference, etc., for the wearable system to render identify relevant virtual objects.

Example Methods for Rendering Virtual Objects Based on Contextual Factors

Figure 16:
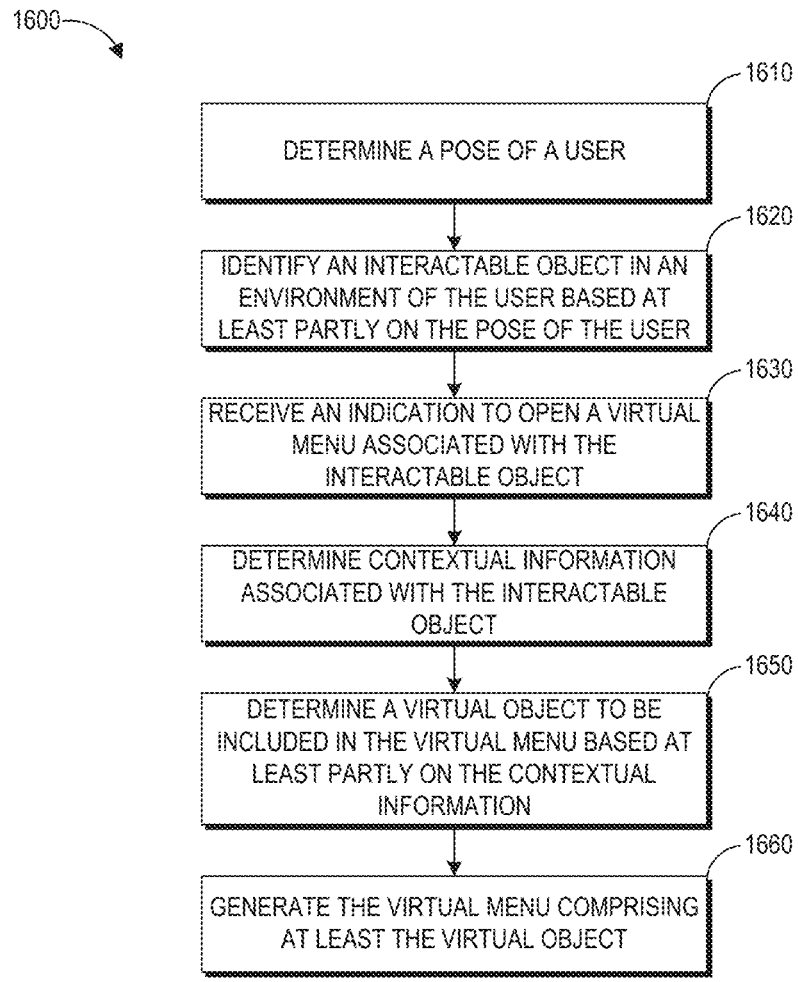
FIG. 16 is a flowchart of an example method for generating a virtual menu based on contextual information.

FIG. 16 is a flowchart of an example method for generating a virtual menu based on contextual information. The process 1600 can be performed by the wearable system described herein. The wearable system can include a user input device (see e.g., user input device 466 in FIG. 4) configured to receive indications of various user interaction, a display which can display virtual objects near the physical objects, and pose sensors. The pose sensors can detect and track a user's pose which can include an orientation of the body relative to the user's environment or the position or movement of a portion of the user's body such as a gesture being made by the user's hand or the user's direction of gaze. The pose sensors can include an inertial measurement unit (IMU) described with reference to FIGS. 2, 4, and 9, an outward-facing imaging system and/or an eye-tracking camera (e.g. the camera 464 shown in FIG. 4). The IMU can include accelerometers, gyroscopes, and other sensors.

At block 1610, the wearable system can determine a pose of a user using one or more pose sensors. As described herein, the pose may include an eye pose, a head pose, or a body pose, in combination or the like. Based on the user's pose, at block 1620, the wearable system can identify an interactable object in the user's environment. For example, the wearable system may use conecasting technique to identify an object that intersects with the user's direction of gaze.

At block 1630, the user can actuate a user input device and provide an indication to open a virtual menu associated with the interactable object. The virtual menu may include a plurality of virtual objects as menu options. The plurality of virtual objects may be a subset of virtual objects in the user's environment or a subset of virtual objects associated with the interactable object. The virtual menu may have many graphic representations. Some examples of the virtual menu are shown as the object 1220 and the object 1210 in FIG. 12, the virtual user interface 1310 in FIGS. 13 and 14, and the object 1320 in FIG. 13, and the object 1430 in FIG. 14, and the object 1530 in FIG. 15. In certain implementations, the indication to open the virtual menu does not have to be received from the user input device. The indication may be associated with a direct user input, such as, e.g., a user's head pose, eye gaze, body pose, gesture, voice command, etc.

At block 1640, the wearable system can determine contextual information associated with the interactable object. The contextual information can include affordances of the interactable object, functions of the environment (e.g., work environment or living environment), characteristics of the user (such as the user's age or preference), or current user interactions with objects in the environments, etc., in combination or the like. For example, the wearable system can determine affordances of the interactable object by analyzing characteristics of the interactable object such as its function, orientation (horizontal v. vertical), location, shape, size, etc. The wearable system can also determine the affordances of the interactable object by analyzing its relationship to the environment. For example, an end table in a living room environment may be used for entertainment purpose while an end table in a bedroom environment may be used for holding items before a person goes to sleep.

The contextual information associated with the interactable object may also be determined from the characteristics of the user or from interactions of the user with the objects in the environment. For example, the wearable system may identify the age of the user and only present information commensurate with the user's age. As another example, the wearable system can analyze the user's previous usage pattern with the virtual menu (such as the types of virtual objects the user often uses) and tailor the content of the virtual menu according to the previous usage pattern.

At block 1650, the wearable system can identify a list of virtual objects to be included in the virtual menu based on the contextual information. For example, the wearable system can identify a list of applications with functions relevant to the interactable object and/or functions relevant to the user's environment. As another example, the wearable system may identify virtual objects to be included in the virtual menu based on user's characteristics such as age, gender, and previous usage patterns.

At block 1660, the wearable system can generate a virtual menu based on the identified list of virtual objects. The virtual menu may include all virtual objects on the identified list. In some embodiments, the menu may be limited in space. The wearable system may prioritize different types of contextual information so that only a subset of the list is shown to the user. For example, the wearable system may determine that the previous usage pattern is the most important contextual information and therefore only displays the top five virtual objects based on the previous usage pattern.

The user can perform various actions with the menu such as, e.g., browsing through the menu, showing available virtual objects that were not previously selected based on the analysis of some of the contextual information, exiting the menu, or selecting one or more objects on the menu to interact with.

Figure 17:
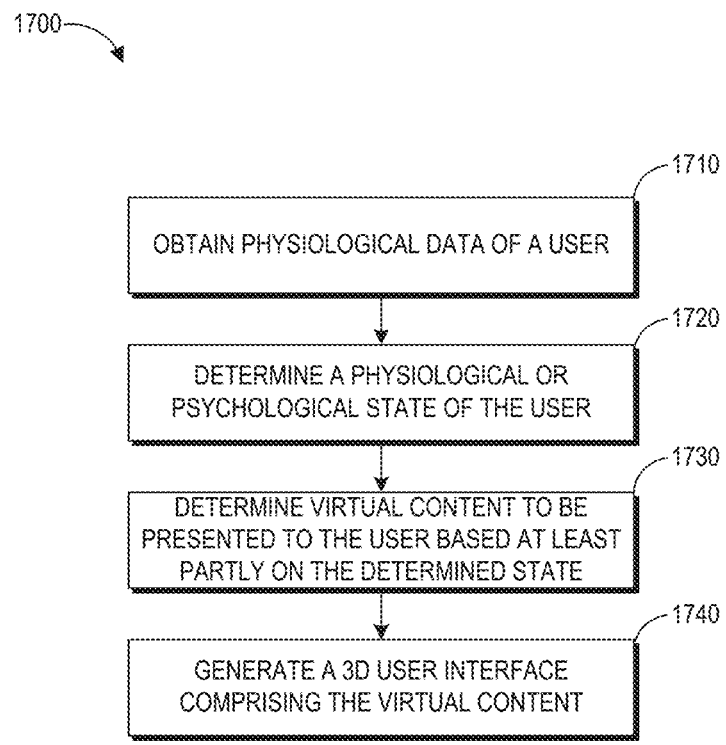
FIG. 17 is a flowchart of an example method for selecting virtual content based at least partly on a user's physiological and/or psychological state.

Example Methods for Rendering Virtual Objects Based on a User's Physiological Data FIG. 17 is a flowchart of an example method for selecting virtual content based at least partly on a user's physiological data. The process 1700 can be performed by a wearable system described herein. The wearable system may include various sensors 232 such as, for example, physiological sensors configured to measure the user's physiological parameters, inward-facing imaging system configured to track the user's eye region, and so on.

At block 1710, the wearable system can obtain physiological data of a user. As described with reference to FIGS. 2 and 4, the wearable system can use physiological sensors, alone or in combination with the inward-facing imaging system, to measure the user's physiological data. For example, the wearable system can determine the user's galvanic skin response using one or more physiological sensors. The wearable system can further determine the user's eye movement using the inward-facing imaging system.

As shown at block 1720, the wearable system can determine a physiological or psychological state of the user using the physiological data. For example, the wearable system can use the user's galvanic skin response and/or the user's eye movement to determine whether a user is excited about certain content.

At block 1730, the wearable system can determine virtual content to be presented to the user. The wearable system can make such determination based on the physiological data. For example, using the physiological data, the wearable system may determine that the user is stressed. The wearable system can accordingly present virtual objects (such as music or video games) associated with lowering the user's stress.

The wearable system can also present virtual content based on an analysis of the physiological data in combination with other contextual information. For example, based on the user's location, the wearable system may determine that the user is experiencing stress at work. Because the user typically does not play games or listen to music during work hours, the wearable system may only suggest video games and music during the user's break to help the user lower his stress level.

At block 1740, the wearable system can generate a 3D user interface comprising the virtual content. For example, the wearable system may show icons for music and for video games when it detects that the user is experiencing stress. The wearable system can present a virtual menu while a user is interacting with a physical object. For example, the wearable system can show the icons for music and video games when the user actuates a user input device in front of a desk during his work break.

Techniques in the various examples described herein can provide a subset of available virtual objects or user interface interaction options to a user. This subset of virtual objects or user interface interaction options can be provided in a variety of forms. Although the examples are mainly described with reference to presenting a menu, other types of user interface presentations are also available. For example, the wearable system can render icons of the virtual objects in the subset of virtual objects. In certain implementations, the wearable system can automatically perform an operation based on the contextual information. For example, the wearable system may automatically initiate a telepresence session with the user's most frequent contact if the user is near a mirror. As another example, the wearable system can automatically launch a virtual object if the wearable system determines that the user is most likely interested in the virtual object.

Other Embodiments

In a 1st aspect, a method for generating a virtual menu in an environment of a user in a three-dimensional (3D) space, the method comprising: under control of an augmented reality (AR) system comprising computer hardware, the AR system configured to permit user interaction with objects in the environment of the user, the AR system comprising a user input device, an AR display, and an inertial measurement unit (IMU) configured to detect a pose of a user: determining, using the IMU, the pose of the user; identifying, based at least partly on the pose of the user, a physical object in the environment of the user in the 3D space; receiving, via the user input device, an indication to open a virtual menu associated with the physical object; determining contextual information associated with the physical object; determining a virtual object to be included in the virtual menu based at least partly on the determined contextual information; determining a spatial location for displaying the virtual menu based at least partly on the determined contextual information; generating the virtual menu comprising at least the determined virtual object; and displaying to the user, via the AR display, the generated menu at the spatial location.

In a 2nd aspect, the method of aspect 1, wherein the pose comprises one or more of: a head pose or a body pose.

In a 3rd aspect, the method of aspect 1 or aspect 2, wherein the ARD further comprises an eye-tracking camera configured to track eye poses of the user.

In a 4th aspect, the method of aspect 3, wherein the pose comprises an eye pose.

In a 5th aspect, the method of any one of the aspects 1-4, wherein the contextual information comprises one or more of the following: an affordance of the physical object; a function of the environment; a characteristic of the user; or a current or past interaction of the user with the AR system.

In a 6th aspect, the method of aspect 5, wherein the affordance of the physical object comprises a relation between the physical object and the environment of the physical object which affords an opportunity for an action or use associated with the physical object.

In a 7th aspect, the method of aspect 5 or aspect 6, wherein the affordance of the physical object is based at least partly on one or more of the following: a function of the physical object, an orientation, a type, a location, a shape, a size, or the environment in which the physical object is located.

In a 8th aspect, the method of aspect 7, wherein the orientation of the physical object comprises horizontal or vertical.

In a 9th aspect, the method of any one of the aspects 5-8, wherein the environment is a living environment or a working environment.

In a 10th aspect, the method of any one of the aspects 5-9, wherein the environment is a private environment or a public environment.

In a 11th aspect, the method of aspect 5, wherein the characteristic of the user comprises one or more of the following: an age, a gender, an educational level, an occupation, or a preference.

In a 12th aspect, the method of aspect 11, wherein the preference is based at least partly on a previous usage pattern of the user, wherein the previous usage pattern comprises information on a location or a time for which the virtual object is used.

In a 13th aspect, the method of aspect 5, wherein the current interaction comprises a telepresence session between the user of the AR system and another user.

In a 14th aspect, the method of any one of the aspects 1-13, wherein the contextual information is encoded in a fiducial marker, wherein the fiducial marker is associated with the physical object.

In a 15th aspect, the method of aspect 14, wherein the fiducial marker comprises an optical marker or an electromagnetic marker.

In a 16th aspect, the method of any one of the aspects 1-15, wherein the objects comprise at least one of a physical object or a virtual object.

In a 17th aspect, a method for rendering a plurality of virtual objects in an environment of a user in a three-dimensional (3D) space, the method comprising: under control of an augmented reality (AR) system comprising computer hardware, the AR system configured to permit user interaction with objects in the environment of the user, the AR system comprising a user input device, an AR display, and a pose sensor configured to detect a pose of the user: determining, using the pose sensor, the pose of the user; identifying, based at least partly on the pose of the user, an interactable object in the environment of the user in the 3D space; receiving, via the user input device, an indication to present a plurality of virtual objects associated with the interactable object; determining contextual information associated with the interactable object; determining a plurality of virtual objects to be displayed to the user based at least partly on the determined contextual information; and displaying to the user, via the AR display, the determined plurality of virtual objects.

In a 18th aspect, the method of aspect 17, wherein the pose sensor comprises one or more of: an inertial measurement unit, an eye-tracking camera or an outward-facing imaging system.

In a 19th aspect, the method of aspect 17 or aspect 18, wherein the pose comprises one or more of: a head pose, an eye pose, or a body pose.

In a 20th aspect, the method of any one of aspects 17 to 19, wherein the contextual information comprises one or more of the following: an affordance of the interactable object; a function of the environment; a characteristic of the user; or a current or past interaction of the user with the AR system.

In a 21st aspect, the method of aspect 20, wherein the affordance of the interactable object comprises a relation between the interactable object and the environment of the interactable object which affords an opportunity for an action or use associated with the interactable object.

In a 22nd aspect, the method of aspect 20 or aspect 21, wherein the affordance of the interactable object is based at least partly on one or more of the following: a function of the interactable object, an orientation, a type, a location, a shape, a size, or an environment in which the physical object is located.

In a 23rd aspect, the method of aspect 22, wherein the orientation of the interactable object comprises horizontal or vertical.

In a 24th aspect, the method of any one of the aspects 20-23, wherein the environment is a living environment or a working environment.

In a 25th aspect, the method of any one of the aspects 20-24, wherein the environment is a private environment or a public environment.

In a 26th aspect, the method of aspect 20, wherein the characteristic of the user comprises one or more of the following: an age, a gender, an educational level, an occupation, or a preference.

In a 27th aspect, the method of aspect 26, wherein the preference is based at least partly on a previous usage pattern of the user that comprises information on a location or a time for which the virtual object is used.

In a 28th aspect, the method of aspect 20, wherein the current interaction comprises a telepresence session.

In a 29th aspect, the method of any one of the aspects 17-28, wherein the contextual information is encoded in a fiducial marker, wherein the fiducial marker is associated with the interactable object.

In a 30th aspect, the method of aspect 29, wherein the fiducial marker comprises an optical marker or an electromagnetic marker.

In a 31st aspect, the method of any one of the aspects 17-30, wherein the objects comprise at least one of: a physical object or a virtual object.

In a 32nd aspect, the method of any one of the aspects 17-31, wherein the interactable object comprises at least one of: a physical object or a virtual object.

In a 33rd aspect, an augmented reality (AR) system comprising computer hardware, a user input device, an AR display, and a pose sensor is configured to perform any one of the methods in aspects 1-32.

In a 34th aspect, a method for selectively presenting virtual content to a user in a three-dimensional space (3D), the method comprising: under control of a wearable device comprising a computer processor, a display, and a physiological sensor configured to measure a physiological parameter of a user: obtaining, using the physiological sensor, data associated with the physiological parameter of the user; determining, based at least partly on the data, a physiological state of the user; determining virtual content to be presented to the user based at least partly on the physiological state; determining a spatial location for displaying the virtual content in a 3D space; generating a virtual user interface comprising at least the determined virtual content; and displaying to the user, via the display of the wearable device, virtual content at the determined spatial location.

In a 35th aspect, the method of aspect 34, wherein the physiological parameter comprises at least one of: a heart rate, a pupil dilation, a galvanic skin response, a blood pressure, an encephalographic state, a respiration rate, or an eye movement.

In a 36th aspect, the method of any one of aspects 34-35, further comprising obtaining data associated with the physiological parameter of the user using an inward-facing imaging system configured to image one or both eyes of the user.

In a 37th aspect, the method of any one of aspects 34-36, further comprising determining a psychological state based on the data.

In a 38th aspect, the method of any one of aspects 34-37, wherein the virtual content comprises a virtual menu.

In a 39th aspect, the method of any one of aspects 34-38, wherein the virtual content is further determined based on at least one of the following: an affordance of a physical object associated with the virtual content; a function of an environment of the user; a characteristic of the user; individuals present in the environment; information encoded in a fiducial marker associated with the physical object; or a current or past interaction of the user with the wearable system.

In a 40th aspect, the method of aspect 39, wherein the affordance of the physical object comprises a relation between the physical object and the environment of the physical object which affords an opportunity for an action or use associated with the physical object.

In a 41st aspect, the method of aspect 39 or aspect 40, wherein the affordance of the physical object is based at least partly on one or more of the following: a function of the physical object, an orientation, a type, a location, a shape, a size, or the environment in which the physical object is located.

In a 42nd aspect, the method of aspect 41, wherein the orientation of the physical object comprises horizontal or vertical.

In a 43rd aspect, the method of any one of the aspects 39-42, wherein the environment is a living environment or a working environment.

In a 44th aspect, the method of any one of the aspects 39-43, wherein the environment is a private environment or a public environment.

In a 45th aspect, the method of aspect 39, wherein the characteristic of the user comprises one or more of the following: an age, a gender, an educational level, an occupation, or a preference.

In a 46th aspect, the method of aspect 45, wherein the preference is based at least partly on a previous usage pattern of the user, wherein the previous usage pattern comprises information on a location or a time for which the virtual object is used.

In a 47th aspect, the method of aspect 39, wherein the current interaction comprises a telepresence session between the user of the AR system and another user.

In a 48th aspect, the method of any one of aspects 34-47, wherein the wearable device comprises an augmented reality system.

In a 49th aspect, the wearable device comprising a computer processor, a display, and a physiological sensor configured to measure a physiological parameter of a user, the wearable device configured to perform any one of the methods in aspects 34-48.

In a 50th aspect, a wearable system for generating virtual content in a three-dimensional (3D) environment of a user, the wearable system comprising: an augmented reality display configured to present virtual content in a 3D view to a user; a pose sensor configured to acquire position or orientation data of a user and to analyze the position or orientation data to identify a pose of the user; a hardware processor in communication with the pose sensor and the display, the hardware processor programmed to: identify, based at least partly on the pose of the user, a physical object in the environment of the user in the 3D environment; receive an indication to initiate an interaction with the physical object; identify a set of virtual objects in the environment of the user which is associated with the physical object; determine contextual information associated with the physical object; filter the set of virtual objects to identify a subset of virtual objects from the set of virtual objects based on the contextual information; generate a virtual menu including the subset of virtual objects; determine a spatial location in the 3D environment for presenting the virtual menu based at least partly on the determined contextual information; and present, by the augmented reality display, the virtual menu at the spatial location.

In a 51st aspect, the wearable system of aspect 50, wherein the contextual information comprises an affordance of the physical object which comprises a relation between the physical object and the environment of the physical object which affords an opportunity for an action or use associated with the physical object, and wherein the affordance of the physical object is based at least partly on one or more of the following: a function of the physical object, an orientation, a type, a location, a shape, a size, or the environment in which the physical object is located.

In a 52nd aspect, the wearable system of aspect 51, wherein the contextual information comprises an orientation of a surface of the physical object, and wherein to filter the set of virtual objects, the hardware processor is programmed to identify the subset of virtual objects which supports user interface interactions on the surface having the orientation.

In a 53rd aspect, the wearable system of any one of aspects 50-52, wherein the pose sensor comprises an inertial measurement unit configured to measure the user's head pose and to identify the physical object, the hardware processor is programmed to cast a virtual cone based at least partly on the user's head pose and select the physical object where the physical object intersects with a portion of the virtual cone.

In a 54th aspect, the wearable system of any one of aspects 50-53, further comprises a physiological sensor configured to measure the user's physiological parameters, and wherein hardware processor is programmed to determine a psychological state of the user and use the psychological state as part of the contextual information to identify the subset of virtual objects for inclusions in the virtual menu.

In a 55th aspect, the wearable system of aspect 54, wherein physiological parameters are related to at least one of: a heart rate, a pupil dilation, a galvanic skin response, a blood pressure, an encephalographic state, a respiration rate, or an eye movement.

In a 56th aspect, the wearable system of any one of aspects 50-55, wherein the 3D environment comprises a plurality of users and wherein the hardware processor is programmed to determine a common characteristic of the plurality of user and filter the set of virtual objects based on the common characteristic of the plurality of users.

In a 57th aspect, the wearable system of any one of aspects 50-56, wherein the contextual information comprises user's past interactions with the set of virtual objects, and wherein the hardware processor is programmed to identity one or more virtual objects that the user has frequently interacted with and include the one or more virtual objects in the subset of virtual objects for the virtual menu.

In a 58th aspect, the wearable system of any one of aspects 50-57, wherein to determine contextual information associated with the physical object and to filter the set of virtual objects, the hardware processor is programmed to: identify a fiducial marker associated with the physical object, wherein the fiducial marker encodes an identifier of the physical object; decode the fiducial marker to extract the identifier; access a database storing contextual information associated with the physical objects with the identifier; and analyze the contextual information stored in the database to filter the set of virtual objects.

In a 59th aspect, the wearable system of aspect 58, wherein the fiducial marker comprises an ArUco marker.

In a 60th aspect, the wearable system of any one of aspects 50-59, wherein the spatial location for rendering the virtual menu comprises a position or an orientation of the virtual menu with respect to the physical object.

In a 61st aspect, the wearable system of aspect 60, wherein to determine the spatial location for rendering the virtual menu, the hardware processor is programmed to identify a space on a surface of the physical object using an object recognizer associated with the physical object.

In a 62nd aspect, a method for generating virtual content in a three-dimensional (3D) environment of a user, the method comprising: analyzing data acquired from a pose sensor to identify a pose of a user; identifying an interactable object in an 3D environment of the user based at least partly on the pose; receiving an indication to initiate an interaction with the interactable object; determining contextual information associated with the interactable object; selecting a subset of user interface operations from a set of available user interface operations on the interactable object based on the contextual information; and generating an instruction for presenting the subset of user interface operations in a 3D view to the user.

In a 63rd aspect, the method of aspect 62, wherein the pose comprises at least one of: an eye gaze, a head pose, or a gesture.

In a 64th aspect, the method of any one of aspects 62-63, wherein identifying the interactable object comprises performing a conecasting based on the user's head pose; and selecting an object in the user's environment as the interactable object where the object intersects with at least a portion of a virtual cone used in the conecasting.

In a 65th aspect, the method of any one of aspects 62-64, wherein the contextual information comprises an orientation of a surface of the interactable object, and wherein selecting the subset of user interface operations comprises identifying user interface operations that can be performed on the surface having the orientation.

In a 66th aspect, the method of any one of aspects 62-65, wherein the indication to initiate the interaction with the interactable object comprises an actuation of a user input device or a change in the pose of the user.

In a 67th aspect, the method of any one of aspects 62-66, further comprising receiving the user's physiological parameters; and determining a psychological state of the user, wherein the psychological state is part of the contextual information for selecting the subset of user interactions.

In a 68th aspect, the method of aspect 67, wherein physiological parameters are related to at least one of: a heart rate, a pupil dilation, a galvanic skin response, a blood pressure, an encephalographic state, a respiration rate, or an eye movement.

In a 69th aspect, the method of any one of aspects 62-68, wherein generating an instruction for presenting the subset of user interactions in a 3D view to the user comprises: generating a virtual menu comprising the subset of user interface operations; determining a spatial location of the virtual menu based on a characteristic of the interactable object; and generating a display instruction for presentation of the virtual menu at the spatial location in the 3D environment of the user.

OTHER CONSIDERATIONS

Each of the processes, methods, and algorithms described herein and/or depicted in the attached figures may be embodied in, and fully or partially automated by, code modules executed by one or more physical computing systems, hardware computer processors, application-specific circuitry, and/or electronic hardware configured to execute specific and particular computer instructions. For example, computing systems can include general purpose computers (e.g., servers) programmed with specific computer instructions or special purpose computers, special purpose circuitry, and so forth. A code module may be compiled and linked into an executable program, installed in a dynamic link library, or may be written in an interpreted programming language. In some implementations, particular operations and methods may be performed by circuitry that is specific to a given function.

Further, certain implementations of the functionality of the present disclosure are sufficiently mathematically, computationally, or technically complex that application-specific hardware or one or more physical computing devices (utilizing appropriate specialized executable instructions) may be necessary to perform the functionality, for example, due to the volume or complexity of the calculations involved or to provide results substantially in real-time.

Code modules or any type of data may be stored on any type of non-transitory computer-readable medium, such as physical computer storage including hard drives, solid state memory, random access memory (RAM), read only memory (ROM), optical disc, volatile or non-volatile storage, combinations of the same and/or the like. The methods and modules (or data) may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The results of the disclosed processes or process steps may be stored, persistently or otherwise, in any type of non-transitory, tangible computer storage or may be communicated via a computer-readable transmission medium.

Any processes, blocks, states, steps, or functionalities in flow diagrams described herein and/or depicted in the attached figures should be understood as potentially representing code modules, segments, or portions of code which include one or more executable instructions for implementing specific functions (e.g., logical or arithmetical) or steps in the process. The various processes, blocks, states, steps, or functionalities can be combined, rearranged, added to, deleted from, modified, or otherwise changed from the illustrative examples provided herein. In some embodiments, additional or different computing systems or code modules may perform some or all of the functionalities described herein. The methods and processes described herein are also not limited to any particular sequence, and the blocks, steps, or states relating thereto can be performed in other sequences that are appropriate, for example, in serial, in parallel, or in some other manner. Tasks or events may be added to or removed from the disclosed example embodiments. Moreover, the separation of various system components in the implementations described herein is for illustrative purposes and should not be understood as requiring such separation in all implementations. It should be understood that the described program components, methods, and systems can generally be integrated together in a single computer product or packaged into multiple computer products. Many implementation variations are possible.

The processes, methods, and systems may be implemented in a network (or distributed) computing environment. Network environments include enterprise-wide computer networks, intranets, local area networks (LAN), wide area networks (WAN), personal area networks (PAN), cloud computing networks, crowd-sourced computing networks, the Internet, and the World Wide Web. The network may be a wired or a wireless network or any other type of communication network.

The systems and methods of the disclosure each have several innovative aspects, no single one of which is solely responsible or required for the desirable attributes disclosed herein. The various features and processes described above may be used independently of one another, or may be combined in various ways. All possible combinations and subcombinations are intended to fall within the scope of this disclosure. Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. No single feature or group of features is necessary or indispensable to each and every embodiment.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y and at least one of Z to each be present.

Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted can be incorporated in the example methods and processes that are schematically illustrated. For example, one or more additional operations can be performed before, after, simultaneously, or between any of the illustrated operations. Additionally, the operations may be rearranged or reordered in other implementations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method for generating virtual content in a three-dimensional (3D) physical environment of a user, the method comprising:
   under control of a hardware processor;
   analyzing data acquired from a pose sensor to identify a pose of a user;
   identifying a physical surface in a 3D physical environment of the user and at least an object function associated with an object in the 3D physical environment having the physical surface, based at least partly on the pose;

receiving an indication to initiate an interaction with the physical surface;

determining environmental information associated with the physical surface, the environmental information comprising an affordance of the physical surface, wherein the affordance of the physical surface is determined based on a physical environment in which the physical surface is located;

accessing a set of available user interface options associated with the physical surface based on the affordance of the physical surface;

determining a maximum number of user interface options from the set of available user interface options that can legibly fit in a virtual user interface associated with the physical surface;

selecting, based on the maximum number of user interface options that can legibly fit in the virtual user interface on the affordance of the physical surface, and on the object function associated with the object, a subset of user interface options from the set of available user interface options associated with the physical surface, wherein the subset of user interface options selected is less than the set of available user interface options; and generating an instruction for presenting the virtual user interface containing the subset of user interface options that can legibly fit in the virtual user interface in a 3D view to the user.

2. The method of claim 1, wherein the environmental information comprises one or more of: functions of the user's environment, objects in the user's environment, objects and their relationships with the environment, or information associated with the user's environment.

3. The method of claim 1, wherein the virtual user interface comprises a virtual menu.

4. The method of claim 1, wherein the method further comprises:

identifying a person with whom the user is interacting, and wherein the selecting of the subset of user interface options is further based on the person with whom the user is interacting.

5. The method of claim 1, wherein the object is a table, a desk, or a wall.

6. The method of claim 1, wherein the object function associated with the object is variable depending on the environment, and wherein the selecting of the subset of user interface options is based on the object function associated with the object in view of the environment.

7. The method of claim 1, wherein the selecting of the subset of user interface options is further based on one or more of an age, gender, educational level, occupation, and preference of the user.

8. The method of claim 1, wherein the selecting of the subset of user interface options is further based on a physiological state of the user, a psychological state of the user, or autonomic nerve system activity of the user.

9. The method of claim 1, wherein the selecting of the subset of user interface options is further based on a fiducial marker associated with the object.

10. A method for generating virtual content in a three-dimensional (3D) physical environment of a user, the method comprising:

under control of a hardware processor;

analyzing data acquired from a pose sensor to identify a pose of a user;

identifying a physical surface in a 3D physical environment of the user and at least an object function associated with an object in the 3D physical environment having the physical surface, based at least partly on the pose;

receiving an indication to initiate an interaction with the physical surface;

determining object information associated with the physical surface, the object information comprising an affordance of the physical surface;

accessing a set of available user interface options associated with the physical surface based on the object information;

determining a maximum number of user interface options from the set of available user interface options that can legibly fit in a virtual user interface associated with the physical surface;

selecting, based on the maximum number of user interface options that can legibly fit in the virtual user interface and on the affordance of the physical surface and on the object function associated with the object, a subset of user interface options from the set of available user interface options associated with the physical surface, wherein the subset of user interface options selected is less than the set of available user interface options; and generating an instruction for presenting the virtual user interface containing the subset of user interface options that can legibly fit in the virtual user interface in a 3D view to the user.

11. The method of claim 10, wherein the object information comprises one or more of: a shape of a physical object, functions of the physical object, a type of the object, information associated with objects in the user's environment, or an affordance of the physical object.

12. The method of claim 11, wherein the object comprises one or more persons in a field of view of the user.

13. The method of claim 10, wherein the virtual user interface comprises a virtual menu.

14. The method of claim 10, wherein the object is a table, a desk, or a wall.

15. The method of claim 10, wherein the object function associated with the object is variable depending on the environment, and wherein the selecting of the subset of user interface options is based on the object function associated with the object in view of the environment.

16. The method of claim 10, wherein the selecting of the subset of user interface options is further based on one or more of an age, gender, educational level, occupation, and preference of the user.

17. The method of claim 10, wherein the selecting of the subset of user interface options is further based on a physiological state of the user, a psychological state of the user, or autonomic nerve system activity of the user.

18. The method of claim 10, wherein the selecting of the subset of user interface options is further based on a fiducial marker associated with the object.

19. A method for generating virtual content in a three-dimensional (3D) physical environment of a user, the method comprising:

under control of a hardware processor:

analyzing data acquired from a pose sensor to identify a pose of a user; identifying a physical surface in a 3D physical environment of the user and at least an object function associated with an object in the 3D physical environment having the physical surface, based at least partly on the pose;

receiving an indication to initiate an interaction with the physical surface; determining environmental information associated with a fiducial marker associated with the physical surface, the environmental information comprising an affordance of the physical surface, wherein the affordance of the physical surface is determined based on a physical environment in which the physical surface is located;

accessing a set of available user interface options associated with the physical surface based on the information associated with the fiducial marker;

determining a maximum number of user interface options from the set of available user interface options that can legibly fit in a virtual user interface associated with the physical surface;

selecting, based on the maximum number of user interface options that can legibly fit in the virtual user interface and the information associated with the fiducial marker and based on the affordance of the physical surface and on the object function associated with the object, a subset of user interface options from the set of available user interface options associated with the physical surface, wherein the subset of user interface options selected is less than the set of available user interface options; and generating an instruction for presenting the virtual user interface containing the subset of user interface options that can legibly fit in the virtual user interface in a 3D view to the user.

20. The method of claim 19, wherein the virtual user interface comprises a virtual menu.

* * * * *